(12) United States Patent
Nam et al.

(10) Patent No.: US 10,623,767 B2
(45) Date of Patent: Apr. 14, 2020

(54) METHOD FOR ENCODING/DECODING IMAGE AND DEVICE THEREFOR

(71) Applicant: LG Electronics Inc., Seoul (KR)

(72) Inventors: Junghak Nam, Seoul (KR); Eunyong Son, Seoul (KR); Jin Heo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/769,564

(22) PCT Filed: Oct. 19, 2016

(86) PCT No.: PCT/KR2016/011734
§ 371 (c)(1),
(2) Date: Apr. 19, 2018

(87) PCT Pub. No.: WO2017/069505
PCT Pub. Date: Apr. 27, 2017

(65) Prior Publication Data
US 2018/0316934 A1    Nov. 1, 2018

Related U.S. Application Data

(60) Provisional application No. 62/243,615, filed on Oct. 19, 2015.

(51) Int. Cl.
*H04N 19/577* (2014.01)
*H04N 19/119* (2014.01)
(Continued)

(52) U.S. Cl.
CPC ......... *H04N 19/577* (2014.11); *H04N 19/119* (2014.11); *H04N 19/129* (2014.11);
(Continued)

(58) Field of Classification Search
CPC .... H04N 19/176; H04N 19/119; H04N 19/61; H04N 19/105; H04N 19/107;
(Continued)

(56) References Cited

U.S. PATENT DOCUMENTS 9,948,950 B2 *   4/2018   Chen ................... H04N 19/517
2006/0093042 A1   5/2006   Kashima et al.
(Continued)

FOREIGN PATENT DOCUMENTS

JP    2007-96679 A       4/2007
KR   10-2013-0031078 A   3/2013
KR   10-2013-0133250 A   12/2013

*Primary Examiner* — Leron Beck
*Assistant Examiner* — Kehinde Abimbola
(74) *Attorney, Agent, or Firm* — Dentons US LLP

(57) ABSTRACT

Disclosed are a method for encoding/decoding an image and a device therefor. Specifically, a method whereby a decoding device decodes an image comprises: a step of parsing decoding order information for indicating the location of a next block to be decoded after a current block; and a step of determining the next block to be decoded after the current block, on the basis of the decoding order information, wherein the decoding order information indicates the relative location of the next block on the basis of the current block, and the next block can be selected as a block among predefined candidate blocks which can be decoded after the current block.

11 Claims, 13 Drawing Sheets

(51) Int. Cl.
*H04N 19/176* (2014.01)
*H04N 19/59* (2014.01)
*H04N 19/593* (2014.01)
*H04N 19/129* (2014.01)
*H04N 19/139* (2014.01)
*H04N 19/46* (2014.01)
*H04N 19/70* (2014.01)

(52) U.S. Cl.
CPC ......... *H04N 19/139* (2014.11); *H04N 19/176* (2014.11); *H04N 19/46* (2014.11); *H04N 19/59* (2014.11); *H04N 19/593* (2014.11); *H04N 19/70* (2014.11)

(58) Field of Classification Search
CPC .... H04N 19/59; H04N 19/593; H04N 19/109; H04N 19/11; H04N 19/122; H04N 19/13; H04N 19/147; H04N 19/46
See application file for complete search history.

(56) References Cited

U.S. PATENT DOCUMENTS

| | | | |
|---|---|---|---|
| 2010/0135389 A1* | 6/2010 | Tanizawa | H04N 19/159 375/240.12 |
| 2012/0243614 A1 | 9/2012 | Hong et al. | |
| 2013/0243081 A1* | 9/2013 | Chen | H04N 19/597 375/240.02 |
| 2015/0030073 A1* | 1/2015 | Chen | H04N 19/597 375/240.16 |
| 2015/0172714 A1* | 6/2015 | Wu | H04N 19/597 375/240.12 |
| 2015/0172716 A1* | 6/2015 | Chen | H04N 19/105 375/240.02 |
| 2015/0195572 A1* | 7/2015 | Chen | H04N 19/517 375/240.16 |
| 2015/0288985 A1* | 10/2015 | Chen | H04N 19/597 375/240.26 |
| 2015/0382019 A1* | 12/2015 | Chen | H04N 19/597 348/43 |
| 2016/0219278 A1* | 7/2016 | Chen | H04N 19/56 |
| 2016/0309178 A1* | 10/2016 | Ha | H04N 19/52 |

* cited by examiner (A)                  (B)

Intra:

2Nx2N        NxN

Inter:

2Nx2N       NxN       2NxN       Nx2N nLx2N       nRx2N       2NxnU       2NxnD

FIG. 8

| A<br>-1,-1 | | | | A<br>0,-1 | a<br>0,-1 | b<br>0,-1 | c<br>0,-1 | A<br>1,-1 | | | | A<br>2,-1 |
|---|---|---|---|---|---|---|---|---|---|---|---|---|
| | | | | | | | | | | | | |
| | | | | | | | | | | | | |
| | | | | | | | | | | | | |
| A<br>-1,0 | | | | A<br>0,0 | a<br>0,0 | b<br>0,0 | c<br>0,0 | A<br>1,0 | | | | A<br>2,0 |
| d<br>-1,0 | | | | d<br>0,0 | e<br>0,0 | f<br>0,0 | g<br>0,0 | d<br>1,0 | | | | d<br>2,0 |
| h<br>-1,0 | | | | h<br>0,0 | i<br>0,0 | j<br>0,0 | k<br>0,0 | h<br>1,0 | | | | h<br>2,0 |
| n<br>-1,0 | | | | n<br>0,0 | p<br>0,0 | q<br>0,0 | r<br>0,0 | n<br>1,0 | | | | n<br>2,0 |
| A<br>-1,1 | | | | A<br>0,1 | a<br>0,1 | b<br>0,1 | c<br>0,1 | A<br>1,1 | | | | A<br>2,1 |
| | | | | | | | | | | | | |
| | | | | | | | | | | | | |
| | | | | | | | | | | | | |
| A<br>-1,2 | | | | A<br>0,2 | a<br>0,2 | b<br>0,2 | c<br>0,2 | A<br>1,2 | | | | A<br>2,2 |

(a)

(b)

(a)                                    (b)

(c)                                    (d)

(a)

(b)

METHOD FOR ENCODING/DECODING IMAGE AND DEVICE THEREFOR

CROSS-REFERENCE TO RELATED APPLICATIONS

This application is the National Stage filing under 35 U.S.C. 371 of International Application No. PCT/KR2016/011734, filed on Oct. 19, 2016, which claims the benefit of U.S. Provisional Application No. 62/243,615, filed on Oct. 19, 2015, the contents of which are all hereby incorporated by reference herein in their entirety.

TECHNICAL FIELD

The present invention relates to a method for processing still images or videos, and more specifically, to a method for encoding/decoding a still image or video in units of block in an arbitrary encoding/decoding order and a device supporting the same.

BACKGROUND ART

A compression encoding means a series of signal processing techniques for transmitting digitized information through a communication line or techniques for storing the information in a form that is proper for a storage medium. The media including a picture, an image, an audio, and the like may be the target for the compression encoding, and particularly, the technique of performing the compression encoding targeted to the picture is referred to as a video image compression.

The next generation video contents are supposed to have the characteristics of high spatial resolution, high frame rate and high dimensionality of scene representation. In order to process such contents, drastic increase of memory storage, memory access rate and processing power will be resulted.

Accordingly, it is required to design the coding tool for processing the next generation video contents efficiently.

DISCLOSURE

Technical Problem

An object of the present invention is to provide a method for encoding/decoding an image in units of block in an arbitrary encoding/decoding order.

The objects of the present invention are not limited to the technical objects described above, and other technical that are objects not mentioned herein may be understood to those skilled in the art from the description below.

Technical Solution

In one aspect of the present invention, a method for decoding an image by a decoding device includes: parsing decoding order information for indicating a position of a next block to be decoded after a current block; and determining the next block to be decoded after the current block, on the basis of the decoding order information, wherein the decoding order information indicates a relative position of the next block on the basis of the current block, and the next block can be selected as a block among predefined candidate blocks decodable after the current block.

In another aspect of the present invention, a decoding device for decoding an image includes: an information parsing unit for parsing decoding order information for indicating a position of a next block to be decoded after a current block; and a decoded block determination unit for determining the next block to be decoded after the current block, on the basis of the decoding order information, wherein the decoding order information indicates a relative position of the next block on the basis of the current block, and the next block can be selected as a block among predefined candidate blocks decodable after the current block.

Preferably, when the decoding order information about the current block is not present, it is assumed that there is only one candidate block for the current block and the next block of the current block may be determined as the one candidate block.

Preferably, when the decoding order information about the current block is not present, a first block that has not been decoded yet in a raster scan order may be determined as the next block.

Preferably, the candidate blocks may include right block neighboring to a right side of the current block and a bottom block neighboring to a bottom side of the current block.

Preferably, the candidate blocks may further include a bottom-right block neighboring to a bottom-right side of the current block.

Preferably, the candidate blocks may further include a top block neighboring to a top side of the current block and a left block neighboring to a left side of the current block.

Preferably, the candidate blocks may further include a top-left block neighboring to a top-left side of the current block, a top-right block neighboring to a top-right side of the current block, a bottom-left block neighboring to a bottom-left side of the current block and a bottom-right block neighboring to a bottom-right side of the current block.

Preferably, the image may be partitioned into first block units having the same size, and the current block may correspond to a first block.

Preferably, the first block may be partitioned into sub-blocks having arbitrary sizes, and the current block may correspond to a sub-block.

Preferably, the image may be partitioned into second block units having arbitrary sizes, and the current block may correspond to a second block.

Preferably, the decoding order information may further include size information of the next block.

Preferably, when intra-prediction in an intra angular mode is applied to the current block, a predicted sample of a current sample in the current block may be derived by linearly interpolating bidirectional reference samples according to the intra-prediction mode on the basis of the current sample.

Preferably, when inter-prediction is applied to the current block, a candidate block list for deriving motion information of the current block may be derived from candidate blocks decodable after the current block.

Advantageous Effects

According to embodiment of the present invention, reference information of a block, which can be used for decoding of the next block, can be adaptively used by encoding/decoding an image in units of block in an arbitrary encoding/decoding order, and thus optimum prediction performance can be obtained.

According to embodiment of the present invention, optimum prediction performance is obtained by encoding/decoding an image in units of a block in an arbitrary encoding/decoding order, and thus the number of bits used for image compression can be reduced.

According to embodiment of the present invention, compression performance can be improved through enhanced intra-prediction and inter-prediction methods according to decoding in an arbitrary block order.

The technical effects of the present invention are not limited to the technical effects described above, and other technical effects not mentioned herein may be understood to those skilled in the art from the description below.

DESCRIPTION OF DRAWINGS

The accompanying drawings, which are included herein as a part of the description for helping understanding of the present invention, provide embodiments of the present invention and describe the technical features of the present invention with the description below.

FIG. 8 illustrates an integer and fractional sample position for ¼ sample interpolation as an embodiment to which the present invention may be applied.

MODE FOR INVENTION

Figure 1:
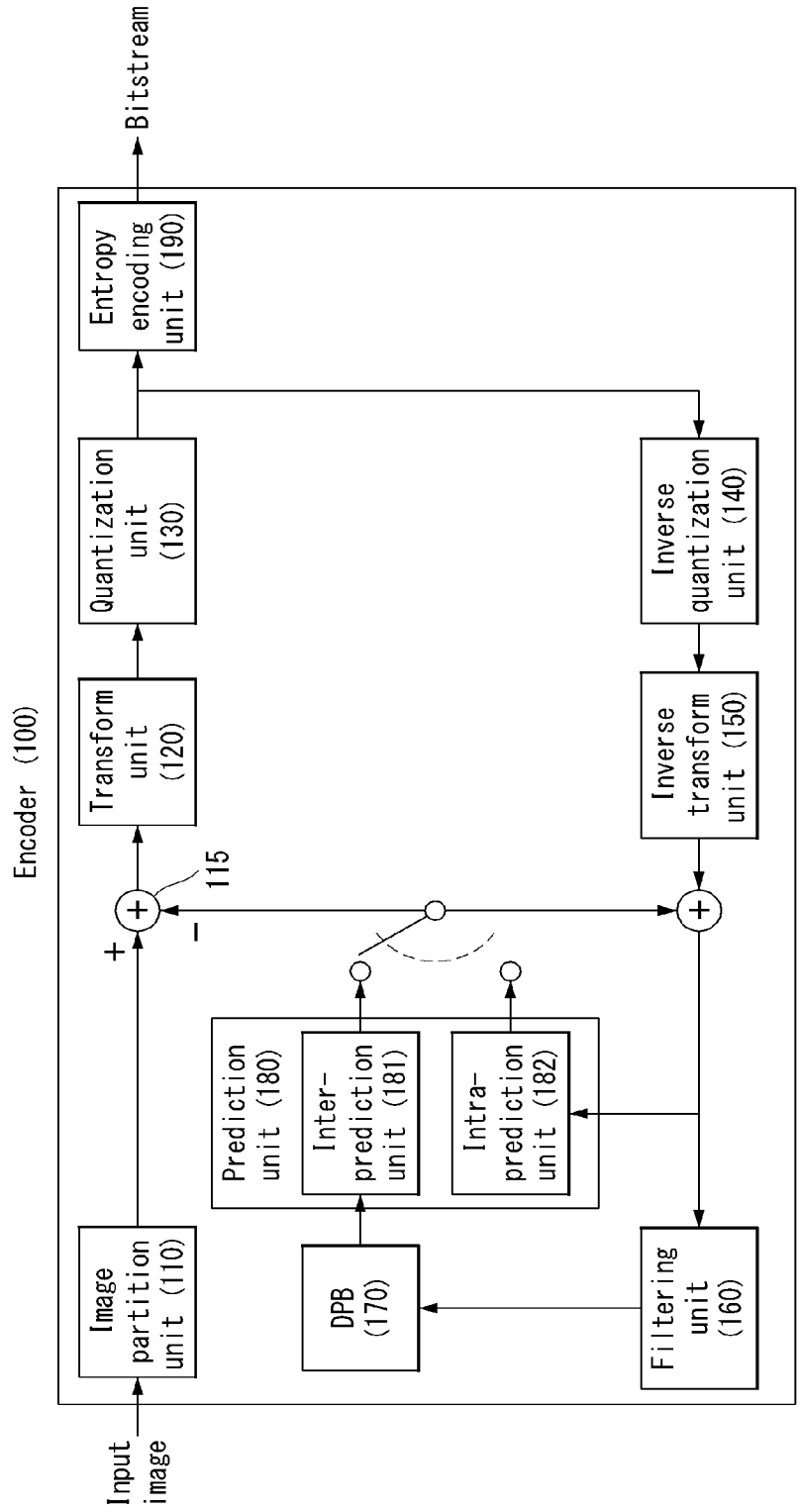
FIG. 1 is an embodiment to which the present invention is applied, and shows a schematic block diagram of an encoder in which the encoding of a still image or moving image signal is performed.

Hereinafter, a preferred embodiment of the present invention will be described by reference to the accompanying drawings. The description that will be described below with the accompanying drawings is to describe exemplary embodiments of the present invention, and is not intended to describe the only embodiment in which the present invention may be implemented. The description below includes particular details in order to provide perfect understanding of the present invention. However, it is understood that the present invention may be embodied without the particular details to those skilled in the art.

In some cases, in order to prevent the technical concept of the present invention from being unclear, structures or devices which are publicly known may be omitted, or may be depicted as a block diagram centering on the core functions of the structures or the devices.

Further, although general terms widely used currently are selected as the terms in the present invention as much as possible, a term that is arbitrarily selected by the applicant is used in a specific case. Since the meaning of the term will be clearly described in the corresponding part of the description in such a case, it is understood that the present invention will not be simply interpreted by the terms only used in the description of the present invention, but the meaning of the terms should be figured out.

Specific terminologies used in the description below may be provided to help the understanding of the present invention. And, the specific terminology may be modified into other forms within the scope of the technical concept of the present invention. For example, a signal, data, a sample, a picture, a frame, a block, etc may be properly replaced and interpreted in each coding process.

Hereinafter, in the present disclosure, 'block' or 'unit' refers to a unit on which a process of encoding/decoding such as prediction, transform, and/or quantization is performed, and may be configured as a multi-dimensional array of a sample (or picture element or pixel).

'Block' or 'unit' may refer to a multi-dimensional array of samples regarding a luma component or a multi-dimensional array of samples regarding a chroma component. Also, both the multi-dimensional array regarding the luma component and the multi-dimensional array regarding the chroma component may be generally called 'block' or 'unit'.

For example, 'block' or 'unit' may be interpreted as having a meaning including all of a coding block (CB) which refers to an array of samples to be encoded/decoded, a coding tree block (CTB) including a plurality of coding blocks, a prediction block (PB) (or a prediction unit (PU)) which refers to an array of samples to which the same prediction is applied, and a transform block (TB) (or a transform unit (TU)) which refer to an array of samples to which the same transform is applied.

Also, in this disclosure, unless otherwise mentioned, 'block' or 'unit' may be interpreted to have a meaning including a syntax structure used in the process of encoding/decoding an array of samples regarding a luma component and/or chroma component. Here, the syntax structure refers to zero or more of syntax elements present within a bit stream in a specific order, and the syntax element refers to an element of data expressed within a bit stream.

For example, 'block' or 'unit' may be interpreted as having a meaning including all of a coding unit (CU) including a coding block (CB) and a syntax structure used for encoding the corresponding coding block, a coding tree unit (CTU) including a plurality of coding units, a prediction unit (PU) including a prediction block (PB) and a syntax structure used for predicting the corresponding prediction block (PB), a transform unit (TU) including a transform block (TB) and a syntax structure used for transforming the corresponding transform block (TB).

Also, in this disclosure, 'block' or 'unit' is not limited to an array of square or rectangular samples (or picture elements or pixels) and may refer to an array of samples (or picture elements or pixels) having a polygonal shape with three or more vertices. In this case, 'block' or 'unit' may be called a polygon block or polygon unit.

FIG. 1 is a schematic block diagram of an encoder encoding a still image or video according to an embodiment to which the present invention is applied.

Referring to FIG. 1, an encoder 100 may include a picture partitioning unit 110, a subtract unit 115, a transform unit 120, a quantization unit 130, an inverse-quantization unit 140, an inverse-transform unit 150, a filtering unit 160, a decoded picture buffer (DPB) 170, a prediction unit 180 and an entropy encoding unit 190. And the prediction unit 180 may include an inter-prediction unit 181 and an intra-prediction unit 182.

The picture partitioning unit 110 may segment an input video signal (or picture or frame) input to the encoder 100 into one or more blocks.

The subtract unit 115 may subtract a predicted signal (or predicted block) output from the prediction unit 180 (i.e., the inter-prediction unit 181 or the intra-prediction unit 182), from the input video signal to generate a residual signal (or a residual block). The generated residual signal (or residual block) is transmitted to the transform unit 120.

The transform unit 120 applies a transform method (e.g., discrete cosine transform (DCT), discrete sine transform (DST), graph-based transform (GBT), Karhunen-Loeve transform (KLT), etc.) to generate a transform coefficient. Here, the transform unit 120 may perform transformation using a transform method determined according to a prediction mode applied to the residual block and a size of the residual block to generate transform coefficients.

The quantization unit 130 quantizes the transform coefficient and transmits it to the entropy encoding unit 190, and the entropy encoding unit 190 performs an entropy coding operation of the quantized signal and outputs it as a bit stream.

Meanwhile, the quantized signal that is outputted from the quantization unit 130 may be used for generating a prediction signal. For example, by applying dequantization and inverse transformation to the quantized signal through the inverse-quantization unit 140 and the inverse-transform unit 150, the residual signal may be reconstructed. By adding the reconstructed residual signal to the prediction signal that is outputted from the inter-prediction unit 181 or the intra-prediction unit 182, a reconstructed signal or a reconstructed block may be generated.

On the other hand, during such a compression process, adjacent blocks are quantized by different quantization parameters from each other, and accordingly, an artifact in which block boundaries are shown may occur. Such a phenomenon is referred to blocking artifact, which is one of the important factors for evaluating image quality. In order to decrease such an artifact, a filtering process may be performed. Through such a filtering process, the blocking artifact is removed and the error for the current picture is decreased at the same time, thereby the image quality being improved.

The filtering unit 160 applies filtering to the reconstructed signal, and outputs it through a play-back device or transmits it to the decoded picture buffer 170. The filtered signal transmitted to the decoded picture buffer 170 may be used as a reference picture in the inter-prediction unit 181. As such, by using the filtered picture as a reference picture in an inter-picture prediction mode, the encoding rate as well as the image quality may be improved.

The decoded picture buffer 170 may store the filtered picture in order to use it as a reference picture in the inter-prediction unit 181.

The inter-prediction unit 181 performs a temporal prediction and/or a spatial prediction by referencing the reconstructed picture in order to remove a temporal redundancy and/or a spatial redundancy.

Here, since the reference picture used for performing a prediction is a transformed signal that goes through the quantization or the inverse-quantization by a unit of block when being encoded/decoded previously, there may exist blocking artifact or ringing artifact.

Accordingly, in order to solve the performance degradation owing to the discontinuity of such a signal or the quantization, by applying a low pass filter to the inter-prediction unit 181, the signals between pixels may be interpolated by a unit of sub-pixel. Herein, the sub-pixel means a virtual pixel that is generated by applying an interpolation filter, and an integer pixel means an actual pixel that is existed in the reconstructed picture. As a method of interpolation, a linear interpolation, a bi-linear interpolation, a wiener filter, and the like may be applied.

The interpolation filter may be applied to the reconstructed picture, and may improve the accuracy of prediction. For example, the inter-prediction unit 181 may perform prediction by generating an interpolation pixel by applying the interpolation filter to the integer pixel, and by using the interpolated block that includes interpolated pixels.

The intra-prediction unit 182 predicts a current block with reference to samples around a block to be currently encoded. The intra-prediction unit 182 may perform the following process to perform intra-prediction. First, the intra-prediction unit 182 may prepare a reference sample required for generating a predicted signal. Also, the intra-prediction unit 182 may generate a predicted signal (predicted block) using the prepared reference sample. Thereafter, a prediction mode is encoded. Here, the reference sample may be prepared through reference sample padding and/or reference sample filtering. Since the reference sample has undergone a prediction and reconstructing process, it may have a quantization error. Thus, in order to reduce such an error, a reference sample filtering process may be performed on each prediction mode used for intra-prediction.

The predicted signal (or predicted block) generated through the inter-prediction unit 181 or the intra-prediction unit 182 may be used to generate a reconstructed signal (or reconstructed block) or a residual signal (or residual block).

Figure 2:
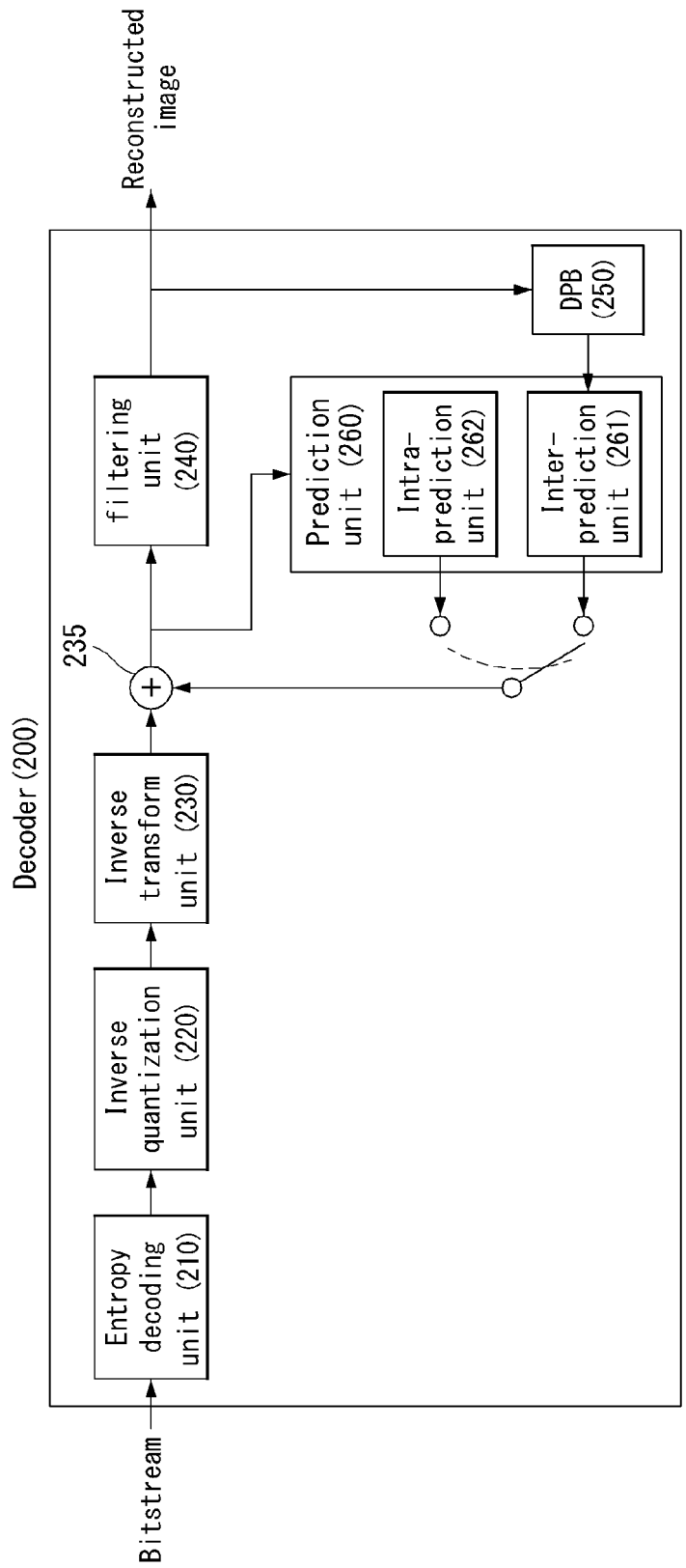
FIG. 2 is an embodiment to which the present invention is applied, and shows a schematic block diagram of a decoder in which the encoding of a still image or moving image signal is performed.

FIG. 2 is a schematic block diagram of a decoder decoding a still image or a video signal according to an embodiment to which the present invention is applied.

Referring to FIG. 2, a decoder 200 may include an entropy decoding unit 210, an inverse-quantization unit 220, an inverse-transform unit 230, an add unit 235, a filtering unit 240, a decoded picture buffer (DPB) 250 and a prediction unit 260. And the prediction unit 260 may include an inter-prediction unit 261 and an intra-prediction unit 262.

And, the reconstructed video signal outputted through the decoder 200 may be played through a play-back device.

The decoder 200 receives the signal (i.e., bit stream) outputted from the encoder 100 shown in FIG. 1, and the entropy decoding unit 210 performs an entropy decoding operation of the received signal.

The inverse-quantization unit 220 acquires a transform coefficient from the entropy-decoded signal using quantization step size information.

The inverse-transform unit 230 inverse-transforms the transform coefficient by applying an inverse-transform technique to obtain a residual signal (or residual block).

The add unit 235 adds the obtained residual signal (or residual block) to the predicted signal (or predicted block) output from the inter-prediction unit 261 or the intra-prediction unit 262 to generate a reconstructed signal (or reconstructed block).

The filtering unit 240 applies filtering to the reconstructed signal (or reconstructed block) and outputs the filtered signal to a reproducing device (or player) or transmits the same to the DPB 250. The filtered signal transmitted to the DPB 250 may be used as reference picture in the inter-prediction unit 261.

In this specification, the embodiments described in the filtering unit 160, the inter-prediction unit 181 and the intra-prediction unit 182 of the encoder 100 may also be applied to the filtering unit 240, the inter-prediction unit 261 and the intra-prediction unit 262 of the decoder, respectively, in the same way.

Block Dividing Structure

Generally, the block-based image compression method is used in the compression technique (e.g., HEVC) of a still image or a video. The block-based image compression method is a method of processing an image by partitioning it into a specific block unit, and may decrease the use of memory and the amount of operation.

Figure 3:
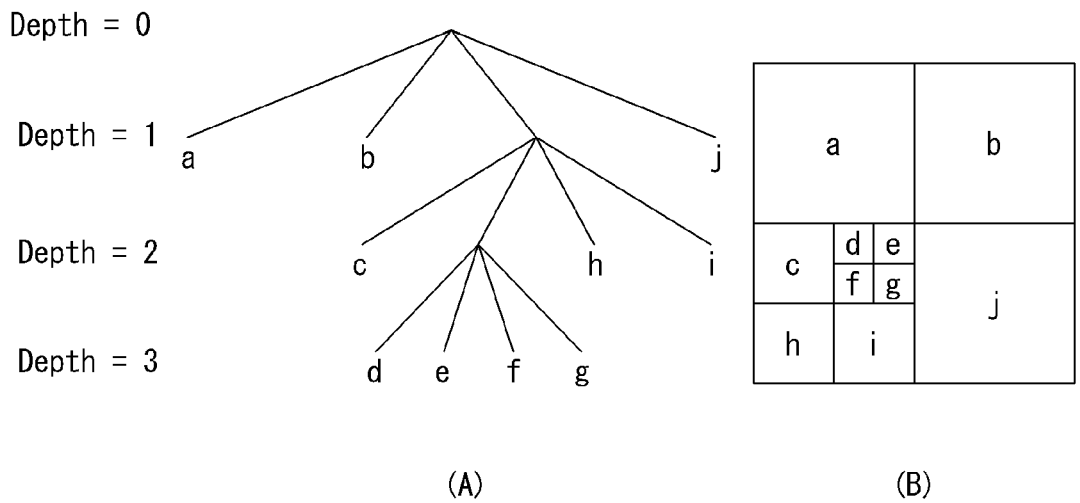
FIG. 3 is a diagram for illustrating the split structure of a coding unit to which the present invention may be applied.

FIG. 3 is a diagram for describing a partition structure of a coding unit that may be applied to the present invention.

An encoder partitions a single image (or picture) in a coding tree unit (CTU) of a rectangle shape, and encodes the CTU sequentially one by one according to a raster scan order.

In the HEVC, a size of CTU may be determined by one of 64×64, 32×32 and 16×16. The encoder may select and use the size of CTU according to the resolution of input image or the characteristics of input image. The CTU includes a coding tree block (CTB) for a luma component and the CTB for two chroma components that correspond to it.

One CTU may be partitioned into a quad tree structure. That is, one CTU may be partitioned into four units each having a square shape and having a half horizontal size and a half vertical size, generating coding units (CUs). Dividing the quad tree structure may be recursively performed. That is, a CU is hierarchically segmented to a quad tree structure from one CTU.

The CU refers to a basic unit in processing an input image, for example, coding of performing intra/inter-prediction. The CU includes a coding block (CB) regarding a luma component and a CB regarding two chroma components corresponding thereto. In HEVC, a size of the CU may be determined to any one of 64×64, 32×32, 16×16, and 8×8.

Referring to FIG. 3, a root node of a quad-tree relates to a CTU. The quad tree is partitioned until it reaches a leaf node, and the leaf node corresponds to a CU.

In detail, a CTU corresponds to a root node and has a smallest depth value (i.e., depth=0). The CTU may not be partitioned depending on characteristics of an input image, and in this case, the CTU corresponds to a CU.

The CTU may be partitioned into a quad tree form, and as a result, lower nodes having a depth of 1 (depth=1) are generated. A node (i.e., a leaf node) which is not partitioned any further from the lower node having a depth of 1 corresponds to a CU. For example, in FIG. 3(b), CU(a), CU(b), and CU(j) have been once partitioned from a CTU and have a depth of 1.

At least any one of the nodes having the depth of 1 may be partitioned into a quad tree form again, and as a result, lower nodes having a depth of 2 (i.e., depth=2) are generated. Also, a node (i.e., leaf node) which cannot be partitioned into any further from the lower node having a depth of 2 corresponds to a CU. For example, in FIG. 3(b), CU(c), CU(h), and CU(i) corresponding to nodes c, h, and i have been partitioned twice and have a depth of 2.

Also, at least any one of the nodes having the depth of 2 may be partitioned again into a quad tree form, and as a result, lower nodes having a depth of 3 (i.e., depth=3) are generated. Also, a node (i.e., leaf node) which cannot be divided any further from the lower node having the depth of 3 corresponds to a CU. For example, in FIG. 3(b), CU(d), CU(e), CU(f), and CU(g) corresponding to d, e, f, and g have been partitioned three times from the CTU and have a depth of 3.

In an encoder, the maximum size or the minimum size of a CU may be determined according to the characteristics of a video image (e.g., resolution) or by considering encoding rate. And, the information for this or the information that may derive this may be included in a bit stream. The CU that has the maximum size is referred to as a largest coding unit (LCU), and the CU that has the minimum size is referred to as a smallest coding unit (SCU).

In addition, the CU that has a tree structure may be hierarchically partitioned with predetermined maximum depth information (or maximum level information). And, each partitioned CU may have the depth information. Since the depth information represents a partitioned count and/or degree of a CU, the depth information may include the information of a size of CU.

Since the LCU is partitioned in a Quad-tree shape, the size of SCU may be obtained by using a size of LCU and the maximum depth information. Or, inversely, the size of LCU may be obtained by using a size of SCU and the maximum depth information of the tree.

For a single CU, the information (e.g., a partition CU flag (split_cu_flag)) that represents whether the corresponding CU is partitioned may be forwarded to a decoder. This partition information is included in all CUs except the SCU. For example, when the value of the flag that represents whether to partition is '1', the corresponding CU is further partitioned into four CUs, and when the value of the flag that represents whether to partition is '0', the corresponding CU is not partitioned any more, and the processing process for the corresponding CU may be performed.

As described above, the CU is a basic unit of the coding in which the intra-prediction or the inter-prediction is performed. The HEVC partitions the CU in a prediction unit (PU) for coding an input image more effectively.

The PU is a basic unit for generating a prediction block, and even in a single CU, the prediction block may be generated in different way by a unit of PU. However, the intra-prediction and the inter-prediction are not used together for the PUs that belong to a single CU, and the PUs that belong to a single CU are coded by the same prediction method (i.e., the intra-prediction or the inter-prediction).

The PU is not partitioned in the Quad-tree structure, but is partitioned once in a single CU in a predetermined shape. This will be described by reference to the drawing below.

Figure 4:
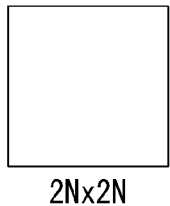
FIG. 4 is a diagram for illustrating a prediction unit to which the present invention may be applied.
Figure 4:
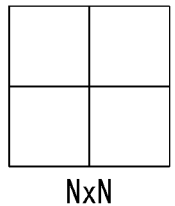
Figure 4:
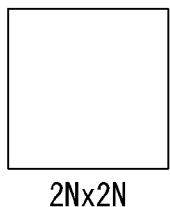
Figure 4:
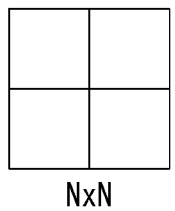
Figure 4:
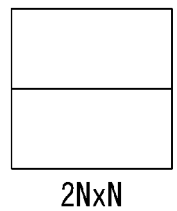
Figure 4:
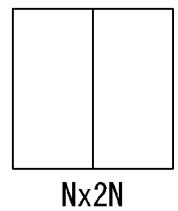
Figure 4:
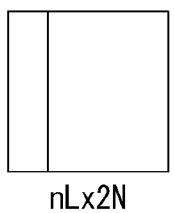
Figure 4:
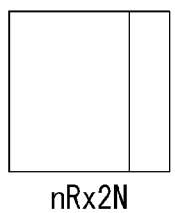
Figure 4:
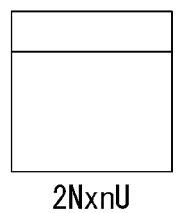
Figure 4:
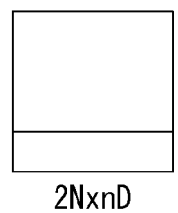

FIG. 4 is a diagram for describing a prediction unit that may be applied to the present invention.

A PU is differently partitioned depending on whether the intra-prediction mode is used or the inter-prediction mode is used as the coding mode of the CU to which the PU belongs.

FIG. 4(a) illustrates a PU of the case that the intra-prediction mode is used, and FIG. 4(b) illustrates a PU of the case that the inter-prediction mode is used.

Referring to FIG. 4(a), assuming the case that the size of a single CU is 2N×2N (N=4, 8, 16 and 32), a single CU may be partitioned into two types (i.e., 2N×2N or N×N).

Here, in the case that a single CU is partitioned into the PU of 2N×2N shape, it means that only one PU is existed in a single CU.

On the other hand, in the case that a single CU is partitioned into the PU of N×N shape, a single CU is partitioned into four PUs, and different prediction blocks are generated for each PU unit. However, such a PU partition may be performed only in the case that the size of CB for the luma component of CU is the minimum size (i.e., the case that a CU is an SCU).

Referring to FIG. 4(b), assuming the case that the size of a single CU is 2N×2N (N=4, 8, 16 and 32), a single CU may be partitioned into eight PU types (i.e., 2N×2N, N×N, 2N×N, N×2N, nL×2N, nR×2N, 2N×nU and 2N×nD.

Similar to the intra-prediction, the PU partition of N×N shape may be performed only in the case that the size of CB for the luma component of CU is the minimum size (i.e., the case that a CU is an SCU).

The inter-prediction supports the PU partition in the shape of 2N×N that is partitioned in a horizontal direction and in the shape of N×2N that is partitioned in a vertical direction.

In addition, the inter-prediction supports the PU partition in the shape of nL×2N, nR×2N, 2N×nU and 2N×nD, which is an asymmetric motion partition (AMP). Here, 'n' means ¼ value of 2N. However, the AMP may not be used in the case that the CU to which the PU is belonged is the CU of minimum size.

In order to encode the input image in a single CTU efficiently, the optimal partition structure of the coding unit (CU), the prediction unit (PU) and the transform unit (TU) may be determined based on a minimum rate-distortion value through the processing process as follows. For example, as for the optimal CU partition process in a 64×64 CTU, the rate-distortion cost may be calculated through the partition process from the CU of 64×64 size to the CU of 8×8 size. The detailed process is as follows.

1) The optimal partition structure of PU and TU that generates the minimum rate distortion value is determined through performing the inter/intra-prediction, the transformation/quantization, the inverse-quantization/inverse transformation and the entropy encoding for the CU of 64×64 size.

2) The optimal partition structure of PU and TU is determined to partition the 64×64 CU into four CUs of 32×32 size and to generate the minimum rate distortion value for each 32×32 CU.

3) The optimal partition structure of PU and TU is determined to further partition the 32×32 CU into four CUs of 16×16 size and to generate the minimum rate distortion value for each 16×16 CU.

4) The optimal partition structure of PU and TU is determined to further partition the 16×16 CU into four CUs of 8×8 size and to generate the minimum rate distortion value for each 8×8 CU.

5) The optimal partition structure of CU in the 16×16 block is determined by comparing the rate-distortion value of the 16×16 CU that is obtained in the process of 3) above with the addition of the rate-distortion value of the four 8×8 CUs that is obtained in the process of 4) above. This process is also performed for remaining three 16×16 CUs in the same manner.

6) The optimal partition structure of CU in the 32×32 block is determined by comparing the rate-distortion value of the 32×32 CU that is obtained in the process of 2) above with the addition of the rate-distortion value of the four 16×16 CUs that is obtained in the process of 5) above. This process is also performed for remaining three 32×32 CUs in the same manner.

7) Lastly, the optimal partition structure of CU in the 64×64 block is determined by comparing the rate-distortion value of the 64×64 CU that is obtained in the process of 1) above with the addition of the rate-distortion value of the four 32×32 CUs that is obtained in the process of 6) above.

In the intra-prediction mode, a prediction mode is selected in units of PU, and prediction and reconstruction are performed on the selected prediction mode in actual units of TU.

The TU refers to a basic unit by which actual prediction and reconstruction are carried out. The TU includes a transform block (TB) regarding a luma component and a TB regarding two chroma components corresponding thereto.

In the foregoing example of FIG. 3, like one CTU is partitioned into a QT structure to generate CUs, a TU is hierarchically partitioned into a QT structure from one CU.

Since the TU is partitioned to a QT structure, the TU partitioned from a CU may be partitioned into smaller TUs again. In HEVC, a size of a TU may be determined to any one of 32×32, 16×16, 8×8, and 4×4.

Referring back to FIG. 3, it is assumed that a root node of a QT is related to a CU. A QT is partitioned until it reaches a leaf node, and the leaf node corresponds to a TU.

In detail, a CU corresponds to a root node and has a smallest depth (i.e., depth=0). The CU may not be partitioned according to characteristics of an input image, and in this case, the CU corresponds to a TU.

The CU may be partitioned to a QT form, and as a result, lower nodes having a depth of 1 (depth=1) are generated. Among the lower nodes having the depth of 1, a node which is not partitioned any further (i.e., a leaf node) corresponds to a TU. For example, in FIG. 3(b), TU(a), TU(b), and TU(j) respectively corresponding to a, b, and j have been once partitioned from a CU and have a depth of 1.

At least any one of nodes having the depth of 1 may also be partitioned to a QT form, and as a result, lower nodes having a depth of 2 (i.e., depth=2) are generated. Among the lower nodes having the depth of 2, a node which is not partitioned any further (i.e., a lead node) corresponds to a TU. For example, in FIG. 3(b), TU(c), TU(h), and TU(i)

respectively corresponding to c, h, and l have been partitioned twice from a CU and have the depth of 2.

Also, at least one of nodes having the depth of 2 may be partitioned again to a QT form, and as a result, lower nodes having a depth of 3 (i.e., depth=3) are generated. Among the lower nodes having the depth of 3, a node which is not partitioned any further (i.e., a leaf node) corresponds to a CU. For example, in FIG. 3(b), TU(d), TU(e), TU(f), and TU(g) respectively corresponding to nodes d, e, f, and g have been partitioned three times and have the depth of 3.

The TU having a tree structure may be hierarchically partitioned with predetermined largest depth information (or largest level information). Also, each of the partitioned TUs may have depth information. Since depth information represents the number by which the TU has been partitioned and/or a degree to which the TU has been divided, the depth information may include information regarding a size of the TU.

Regarding one TU, information (e.g., a split TU flag (split_tranform_flag) representing whether the corresponding TU is partitioned may be delivered to the decoder. The split information is included in every TU except for a TU having a smallest size. For example, if the value of the flag representing partition is '1', the corresponding TU is partitioned again into four TUs, while if the flag representing partition is '0', the corresponding CU is not partitioned any further.

Prediction

In order to reconstruct a current processing unit on which decoding is performed, the decoded part of a current picture including the current processing unit or other pictures may be used.

A picture (slice) using only a current picture for reconstruction, that is, performing only intra-prediction, may be referred to as an intra-picture or I picture (slice). A picture (slice) using the greatest one motion vector and reference index in order to predict each unit may be referred to as a predictive picture or P picture (slice). A picture (slice) using a maximum of two motion vectors and reference indices in order to predict each unit may be referred to as a bi-predictive picture or B picture (slice).

Intra-prediction means a prediction method of deriving a current processing block from a data element (e.g., sample value, etc.) of the same decoded picture (or slice). That is, intra-prediction means a method of predicting a pixel value of the current processing block with reference to reconstructed regions within a current picture.

Inter-prediction refers to a prediction method of deriving a current processing block on the basis of data elements (e.g., sample values or motion vectors) of pictures other than the current picture. That is, inter-prediction means a method of predicting pixel values of the current processing block with reference to reconstructed region within reconstructed pictures other than the current picture.

Intra-prediction

Figure 5:
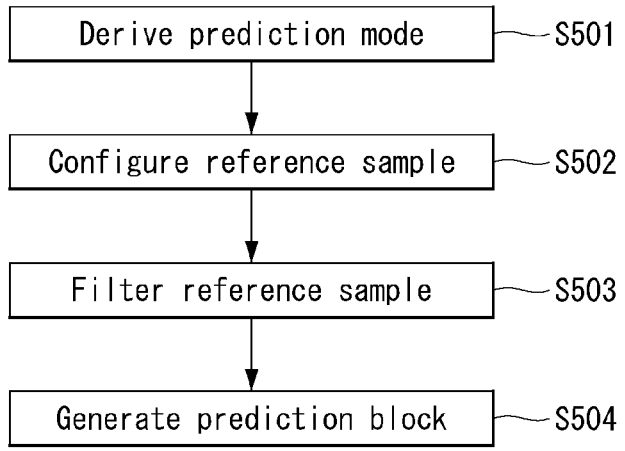
FIG. 5 is an embodiment to which the present invention is applied and is a diagram illustrating an intra-prediction method.

FIG. 5 is an embodiment to which the present invention is applied and is a diagram illustrating an intra-prediction method.

Referring to FIG. 5, the decoder derives an intra-prediction mode of a current processing block (S501).

In intra-prediction, there may be a prediction direction for the location of a reference sample used for prediction depending on a prediction mode. An intra-prediction mode having a prediction direction is referred to as intra-angular prediction mode "Intra_Angular prediction mode." In contrast, an intra-prediction mode not having a prediction direction includes an intra-planar (INTRA_PLANAR) prediction mode and an intra-DC (INTRA_DC) prediction mode.

Figure 6:
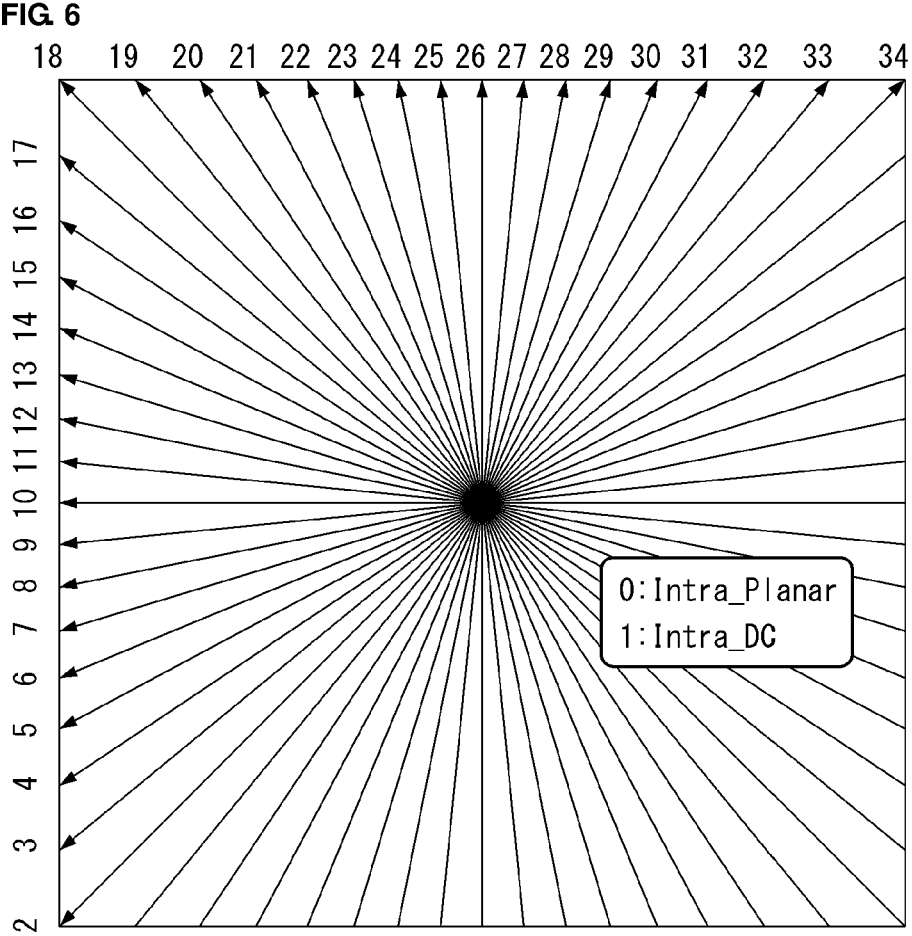
FIG. 6 illustrates prediction directions according to intra-prediction modes.

Table 1 illustrates intra-prediction modes and associated names, and FIG. 6 illustrates prediction directions according to intra-prediction modes.

TABLE 1

| Intra prediction mode | associated names |
|---|---|
| 0 | INTRA_PLANAR |
| 1 | INTRA_DC |
| 2 . . . 34 | INTRA_ANGULAR2 . . . INTRA_ANGULAR34 |

In intra-prediction, prediction may be on a current processing block based on a derived prediction mode. A reference sample used for prediction and a detailed prediction method are different depending on a prediction mode. Accordingly, if a current block is encoded in an intra-prediction mode, the decoder derives the prediction mode of a current block in order to perform prediction.

The decoder checks whether neighboring samples of the current processing block may be used for prediction and configures reference samples to be used for prediction (S502).

In intra-prediction, neighboring samples of a current processing block mean a sample neighboring the left boundary of the current processing block of an nS×nS size, a total of 2×nS samples neighboring the left bottom of the current processing block, a sample neighboring the top boundary of the current processing block, a total of 2×nS samples neighboring the top right of the current processing block, and one sample neighboring the top left of the current processing block.

However, some of the neighboring samples of the current processing block have not yet been decoded or may not be available. In this case, the decoder may configure reference samples to be used for prediction by substituting unavailable samples with available samples.

The decoder may perform the filtering of the reference samples based on the intra-prediction mode (S503).

Whether the filtering of the reference samples will be performed may be determined based on the size of the current processing block. Furthermore, a method of filtering the reference samples may be determined by a filtering flag transferred by the encoder.

The decoder generates a prediction block for the current processing block based on the intra-prediction mode and the reference samples (S504). That is, the decoder generates the prediction block for the current processing block (i.e., generates a prediction sample within the current processing block) based on the intra-prediction mode derived in the intra-prediction mode derivation step S501 and the reference samples obtained through the reference sample configuration step S502 and the reference sample filtering step S503.

If the current processing block has been encoded in the INTRA_DC mode, in order to minimize the discontinuity of the boundary between processing blocks, at step S504, the left boundary sample of the prediction block (i.e., a sample within the prediction block neighboring the left boundary) and the top boundary sample (i.e., a sample within the prediction block neighboring the top boundary) may be filter.

Furthermore, at step S504, in the vertical mode and horizontal mode of the intra-angular prediction modes, as in the INTRA_DC mode, filtering may be applied to the left boundary sample or the top boundary sample.

This is described in more detail. If the current processing block has been encoded in the vertical mode or the horizontal mode, the value of a prediction sample may be derived based on a reference sample located in a prediction direction. In this case, a boundary sample that belongs to the left boundary sample or top boundary sample of the prediction block and that is not located in the prediction direction may neighbor a reference sample not used for prediction. That is, the distance from the reference sample not used for prediction may be much closer than the distance from the reference sample used for prediction.

Accordingly, the decoder may adaptively apply filtering on left boundary samples or top boundary samples depending on whether an intra-prediction direction is a vertical direction or a horizontal direction. That is, the decoder may apply filtering on the left boundary samples if the intra-prediction direction is the vertical direction, and may apply filtering on the top boundary samples if the intra-prediction direction is the horizontal direction.

Inter-prediction (or Prediction Between Pictures)

An inter-prediction means a prediction method of deriving a current block based on a data element (e.g., sample value or motion vector, etc.) of a picture in addition to a current picture. That is, the inter-prediction means a method of predicting a pixel value of the current block by referring to reconstructed regions in other reconstructed picture except the current picture.

The inter-prediction (or prediction between pictures) is a technique of removing redundancy existed between pictures, and performed by motion estimation and motion compensation, largely.

Figure 7:
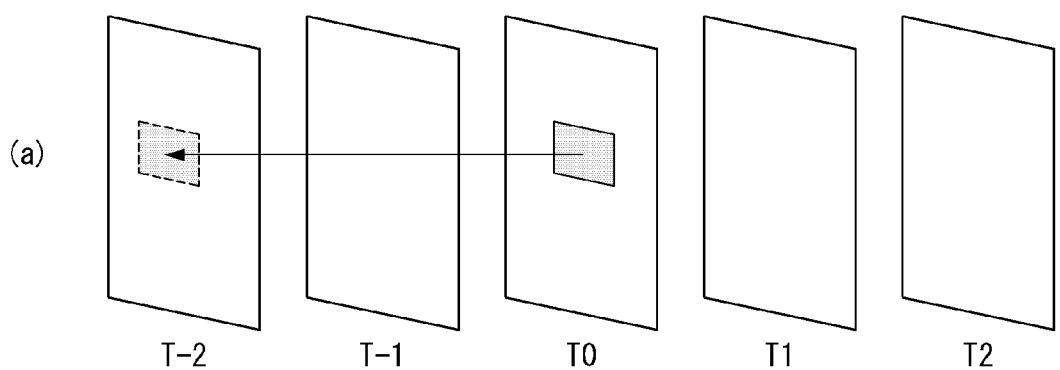
FIG. 7 is a diagram illustrating a direction of an inter-prediction as an embodiment to which the present invention may be applied.
Figure 7:
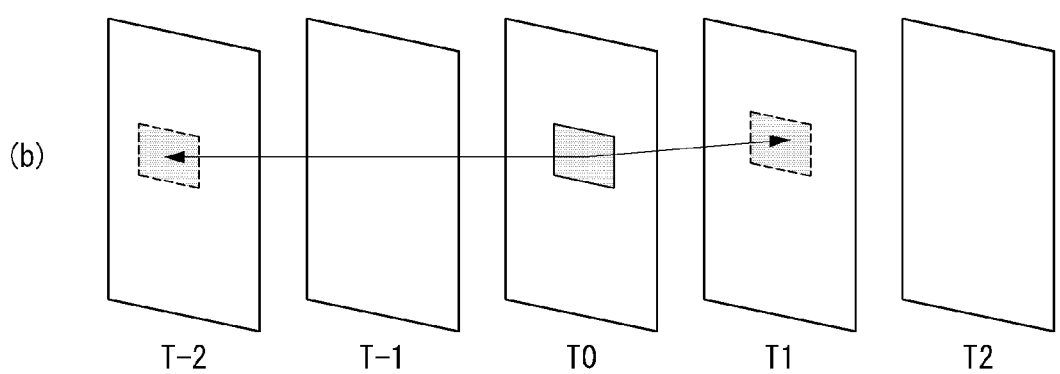

FIG. 7 is a diagram illustrating a direction of an inter-prediction as an embodiment to which the present invention may be applied.

Referring to FIG. 7, an inter-prediction may be divided into Uni-directional prediction that uses only one of a past picture or a future picture as a reference picture on a time axis for a block and Bi-directional prediction that refers past and future pictures simultaneously.

In addition, the Uni-directional prediction may be divided into forward direction prediction that uses a single reference picture displayed (or output) before a current picture temporally and backward direction prediction that uses a single reference picture displayed (or outputted) after a current picture temporally.

The motion parameter (or information) used for specifying a reference region (or reference block) for predicting a current block in the inter-prediction process (i.e., Uni-directional or Bi-directional prediction) includes an inter-prediction mode (herein, the inter-prediction mode may indicate a reference direction (i.e., Uni-directional or Bi-directional) and a reference list (i.e., L0, L1 or Bi-directional)), a reference index (or reference picture index or a reference list index), and motion vector information. The motion vector information may include a motion vector, a motion vector predictor (MVP) value or a motion vector difference (MVD) value. The motion vector difference (MVD) value means a difference value between the motion vector and the motion vector predictor value.

The Uni-directional prediction uses a motion parameter for a direction. That is, a single motion parameter may be required to specify a reference region (or reference block).

The Bi-directional prediction uses a motion parameter for both directions. Maximum two reference regions may be used in the Bi-directional prediction scheme, and the two reference regions may be existed in the same reference picture or existed in different pictures, respectively. That is, maximum two motion parameters may be used in the Bi-directional prediction scheme, two motion vectors may have the same reference picture index or different picture indexes. At this time, all of the reference pictures may be displayed (or outputted) before the current picture temporally or displayed (or outputted) after the current picture temporally.

An encoder performs motion estimation of finding a reference region which is the most similar reference region to a current block in the inter-prediction process. In addition, the encoder may provide a motion parameter for a reference region to a decoder.

Encoder/decoder may obtain a reference region of a current block by using a motion parameter. The reference region exists in a reference picture having the reference index. In addition, a pixel value or an interpolated value of the reference region which is specified by the motion vector may be used as a predictor of the current block. That is, by using the motion information, the motion compensation is performed for predicting an image of the current block from a previously decoded picture.

In order to decrease an amount of transmission in relation to motion vector information, a method of obtaining a motion vector predictor value (mvp) by using motion information of previously coded blocks and transmitting only a difference value (mvd) for it may be used. That is, a decoder calculates a motion vector predictor value of a current block by using the motion information of other blocks that are decoded, and obtains the motion vector value for the current block by using the difference value transmitted from an encoder. When obtaining a motion vector predictor value, the decoder may obtain various motion vector candidate values by using the motion information of other blocks that are already decoded, and may obtain one of them as a motion vector predictor value.

Reference Picture Set and Reference Picture List

In order to manage multiple reference pictures, a set of pictures that are previously decoded is stored in a decoded picture buffer (DPB) for decoding the remaining pictures.

The reconstructed picture used for an inter-prediction among the reconstructed pictures stored in the DPB is referred to as a reference picture. In other words, a reference picture means a picture including a sample that may be used for an inter-prediction in the next decoding process of a picture in the decoding order.

The reference picture set (RPS) means a set of reference pictures associated with a picture, and is configured by all pictures associated previously in the decoding order. The reference picture set may be used for an inter-prediction of an associated picture or a picture that follows the associated picture in the decoding order. That is, the reference picture maintained in the DPB may be referred to as a reference picture set. An encoder may provide a sequence parameter set (SPS) (i.e., a syntax structure including syntax elements) or reference picture set information to a decoder in each slice header.

The reference picture list means a list of a reference picture used for an inter-prediction of P picture (or slice) or B picture (or slice). Here, the reference picture list may divided into two reference picture lists, and may be referred to as reference picture list 0(or L0) and reference picture list 1 (or L1), respectively. In addition, the reference picture belonged to reference picture list 0 is referred to as reference picture 0 (or L0 reference picture) and the reference picture belonged to reference picture list 1 is referred to as reference picture 1 (or L1 reference picture).

In the decoding process of P picture (or slice), a single reference picture list (i.e., reference picture list 0) is used, and in the decoding process of B picture (or slice), two reference picture list (i.e., reference picture list 0 and reference picture list 1) may be used. The information for distinguishing a reference picture list for each reference picture may be provided to a decoder through reference picture set information. The decoder adds a reference picture in reference picture list 0 and reference picture list 1 based on the reference picture set information.

A reference picture index (or reference index) is used for distinguishing a single specific reference picture in the reference picture list.

Fractional Sample Interpolation

A sample of a prediction block for an inter-predicted current block is obtained from a sample value of a corresponding reference region in a reference picture identified by a reference picture index. Here, the corresponding reference region in a reference picture represents a region of a position indicated by a horizontal component and a vertical component of a motion vector. Except the case that a motion vector has an integer value, the fractional sample interpolation is used for generating prediction samples for a non-integer sample coordinate. For example, a motion vector of ¼ unit of a distance between samples may be supported.

For HEVC, the fractional sample interpolation of a luminance component applies 8-tap filter in a horizontal direction and a vertical direction, respectively. In addition, the fractional sample interpolation of color component applies 4-tap filter in a horizontal direction and a vertical direction, respectively.

FIG. 8 illustrates an integer and fractional sample position for ¼ sample interpolation as an embodiment to which the present invention may be applied.

Referring to FIG. 8, a shaded block in which upper-case letter (A_i, j) is written indicates an integer sample position, and a block with no shade a lower-case letter (x_i, j) is written indicates a fractional sample position.

The fractional sample is generated by an interpolation filter being applied to an integer sample value in a horizontal direction and a vertical direction. For example, in the case of horizontal direction, 8-tap filter may be applied to 4 integer sample values in left side and integer sample values in right side based on a fractional sample to generate.

Inter-prediction Mode

In HEVC, a Merge mode and an Advanced Motion Vector Prediction (AMVP) may be used for decreasing amount of motion information.

1) Merge Mode

Merge mode means a method of deriving a motion parameter (or information) from neighboring blocks spatially or temporally.

In the Merge mode, a set of available candidates includes spatial neighbor candidates, temporal candidates and generated candidates.

Figure 9:
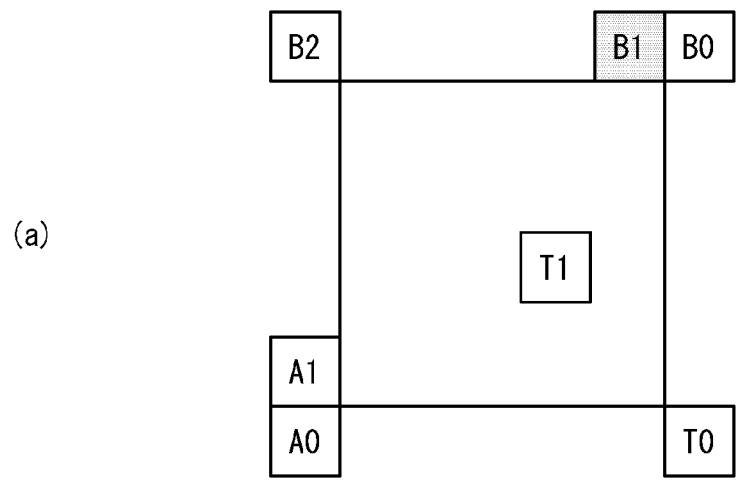
FIG. 9 illustrates a position of spatial candidate as an embodiment to which the present invention may be applied.
Figure 9:
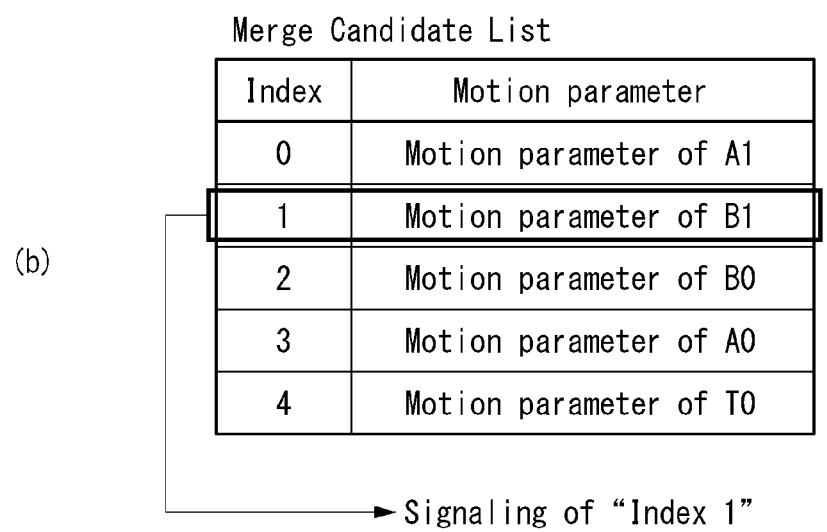

FIG. 9 illustrates a position of spatial candidate as an embodiment to which the present invention may be applied.

Referring to FIG. 9(*a*), it is determined whether each spatial candidate is available according to an order of {A1, B1, B0, A0, B2}. At this time, in the case that a candidate block is encoded in an inter-prediction mode and motion information is not existed or in the case that a candidate block is located outside a current block (or slice), the corresponding candidate block is unable to be used.

After determining a validation of a spatial candidate, a spatial merge candidate may be constructed by excluding unnecessary candidate block from the candidate block of a current block. For example, in the case that a candidate block of the current prediction block is the first prediction block in the same coding block, the corresponding candidate block may be excluded or the candidate blocks having the same motion information may also be excluded.

When the spatial merge candidate construction is completed, a temporal merge candidate configuration process is progressed in an order of {T0, T1}.

In the temporal merge candidate configuration, in the case that a right bottom block T0 of a collocated block of a reference picture is available, the corresponding block is configured as a temporal merge candidate. The collocated block means a block existed in a position corresponding to a current block in a selected reference picture. On the contrary, the block T1 positioned in a center of a collocated block is configured as a temporal merge candidate, otherwise.

The maximum number of merge candidates may be specified in a slice header. In the case that the number of merge candidates is greater than the maximum number, spatial candidates and temporal candidates of the number smaller than the maximum number are maintained. Otherwise, as the numbers of merge candidates, the candidates added up to now are combined until the number of candidates becomes the maximum number, and the additional merge candidates (i.e., combined bi-predictive merging candidates) are generated.

An encoder configures a merge candidate list in such a method and performs Motion Estimation, and signals the candidate block information selected in the merge candidate list as a merge index (e.g., merge_idx[x0][y0]') to a decoder. FIG. 9(*b*) shows the case that B1 block is selected in the merge candidate list, and in this case, "index 1" may be signaled as a merge index to the decoder.

The decoder configures a merge candidate list in the same way as the encoder, and derives motion information in the merge candidate list for a current block from the motion information of a candidate block corresponding to a merge index which is received from the encoder. In addition, the decoder generates a prediction block for the current block based on the derived motion information (i.e., motion compensation).

2) Advanced Motion Vector Prediction (AMVP) Mode

AMVP mode means a method of deriving a motion vector prediction value from a neighboring block. Accordingly, horizontal and vertical motion vector difference (MVD), and a reference index and an inter-prediction mode are signaled to a decoder. The horizontal and vertical motion vector value is calculated by using the derived motion vector prediction value and the motion vector difference (MVD) provided in the encoder.

That is, the encoder configures a motion vector predictor candidate list, and performs Motion Estimation, and signals the motion vector predictor flag (i.e., candidate block information) (e.g., mvp_lX_flag[x0][y0]') selected in the motion vector predictor candidate list to a decoder. The decoder configures a motion vector predictor candidate list in the same way as the encoder, and derives motion vector predictor value of a current block by using the motion information of the candidate block indicated in the motion vector predictor flag received from the encoder. In addition, the decoder obtains a motion vector value for a current block by using the derived motion vector predictor value and the motion vector difference value transmitted from the encoder.

And the decoder generates a predicted block (i.e, an array of predicted samples) for the current block based on the derived motion information (i.e., motion compensation).

In the case of the AMVP mode, among the 5 available candidates in FIG. 9 above, two spatial motion candidates are selected. The first spatial motion candidate is selected from {A0, A1} set located in the left side, and the second spatial motion candidate is selected from {B0, B1, B2} set located in the top side. At this time, in the case that a reference index of a neighboring candidate block is not identical to the current prediction block, a motion vector is scaled.

As a result of a search of the spatial motion candidates, in the case that the number of candidates is two, the candidate configuration is completed, but in the case that the number of candidates is less than two, a temporal motion candidate is added.

Figure 10:
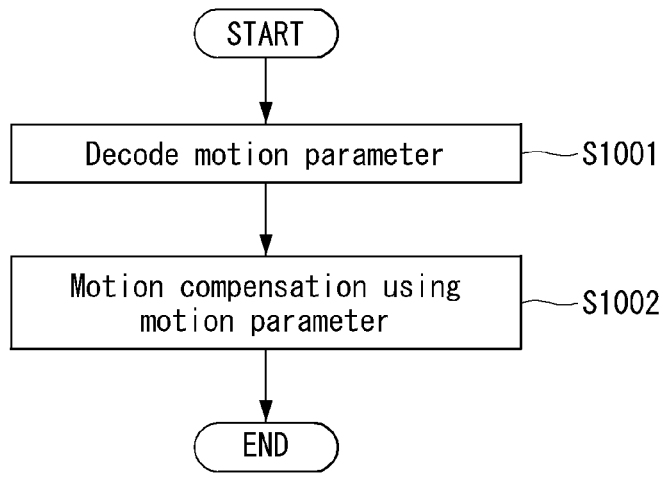
FIG. 10 is a diagram illustrating an inter-prediction method as an embodiment to which the present invention is applied.

FIG. 10 is a diagram illustrating an inter-prediction method as an embodiment to which the present invention is applied.

Referring to FIG. 10, a decoder (particularly, an inter-prediction unit 261 in FIG. 2) decodes a motion parameter for a current block (e.g., prediction block) (step, S1001).

For example, in the case that the merge mode is applied to a current block, the decoder may decode a merge index which is signaled from an encoder. In addition, the decoder may derive a motion parameter of a current block from the motion parameter of the candidate block which is indicated by the merge index.

Furthermore, in the case that the AMVP mode is applied to a current block, the decoder may decode horizontal and vertical motion vector difference (MVD) values which is signaled from the encoder, and may decode a reference index and an inter-prediction mode. In addition, the decoder may derive a motion vector prediction value from the motion parameter of the candidate block indicated by a motion vector predictor flag, and may derive a motion vector value of the current block by using a motion vector prediction value and the received motion vector difference value.

The decoder performs a motion compensation for a current block by using the decoded motion parameter (or information) (step, S1002).

That is, the encoder/decoder performs motion compensation of predicting the image of the current block (i.e., generating a predictive block for the current unit) from a previously decoded picture by using the decoded motion parameter. In other words, the encoder/decoder may derive a predicted block (i.e., arrangement of predicted samples) of the current block from samples of a region corresponding to the current block in a previously decoded reference picture.

Figure 11:
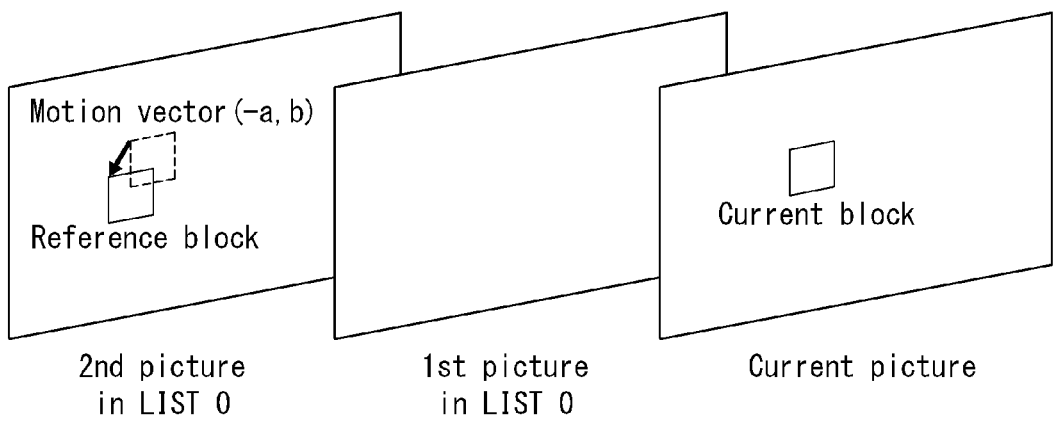
FIG. 11 is a diagram illustrating a motion compensation procedure as an embodiment to which the present invention is applied.

FIG. 11 is a diagram illustrating a motion compensation procedure as an embodiment to which the present invention is applied.

FIG. 11 illustrates the case that the motion parameter for a current block to encode in a current picture is the Uni-directional prediction, LIST0, the second picture in LIST0 and a motion vector (−a, b).

In this case, the current block is predicted by using the values (i.e., sample values of a reference block) in the position which is away as much as (−a, b) from the current block in the second picture of LIST0.

For the Bi-directional prediction, another reference list (e.g., LIST1) and a reference index, and a motion vector difference value are transmitted, and a decoder derives two reference blocks and predict the current block based on it (i.e, generate predicted samples of the current block).

Encoding/Decoding Method Using Arbitrary Coding Order

Figure 12:
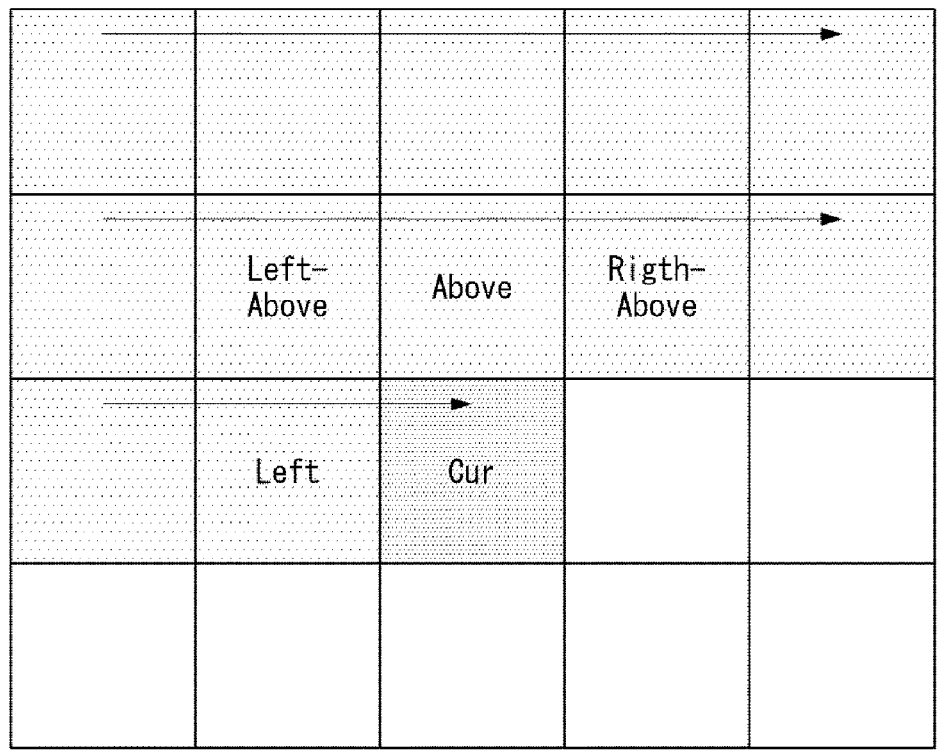
FIG. 12 shows a block scanning order used in a video compression technique and positions of neighboring blocks that can be used for prediction in one block.

FIG. 12 shows a block scanning order used in video compression and positions of neighboring blocks which can be used for prediction in one block.

In general, video compression partitions a picture into specific blocks (e.g. CTUs) (boxes in FIG. 12), encodes and decodes the blocks one by one in sequential scanning order (e.g., raster scan order) (indicated by arrows in FIG. 12) from the top-left of the picture, as shown in FIG. 12.

In addition, video compression is performed with reference to information of encoded and decoded neighboring blocks in order to remove spatial and temporal redundancy. Here, a left block Left, a top block Above, a top-left block Left-Above or a top-right block Right-Above may be used as a neighboring block for a current block Cur.

In this manner, conventional video compression uses a fixed block scanning order (i.e., coding order), and thus right blocks or bottom blocks cannot be used to predict the current block all the time.

Furthermore, although an optimum prediction position that can be predicted in a neighboring block may change according to a motion direction of an object included in an image or a camera movement direction, right blocks or bottom blocks cannot be used to predict the current block all the time, as described above, and thus coding efficiency may decrease.

Accordingly, the present invention proposes a method of encoding/decoding a still image or a moving image using an arbitrary coding order or an arbitrary block scanning order. An arbitrary coding order may also be called an arbitrary decoding order, an arbitrary (block) scanning order and the like and will be collectively called an arbitrary decoding order in the following description for convenience.

When an image is decoded in an arbitrary decoding order, a next block that can be decoded on the basis of the current block may be defined in various forms. This will be described below with reference to the drawing.

Figure 13:
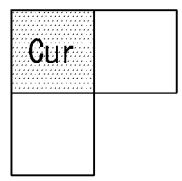
FIG. 13 is a diagram illustrating forms of neighboring blocks on the basis of a current block when an arbitrary decoding order according to an embodiment of the present invention is used.
Figure 13:
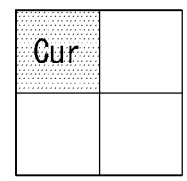
Figure 13:
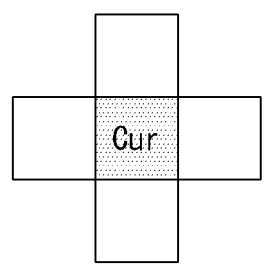
Figure 13:
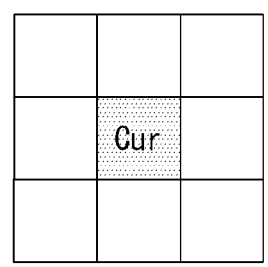

FIG. 13 is a diagram illustrating forms of neighboring blocks on the basis of the current block when an arbitrary decoding order according to an embodiment of the present invention is used.

As shown in FIG. 13(a), a right block and a bottom block of a current decoded block Cur may be defined as next blocks (candidate blocks) that can be decoded after the current decoded block Cur.

As shown in FIG. 13(b), the right block, the bottom block and a bottom-right block of the current encoded block Cur may be defined as next blocks (candidate blocks) that can be decoded after the currently decoded block Cur.

As shown in FIG. 13(c), a left block, the right block, a top block and the bottom block which neighbor the current encoded block Cur in four directions of the current block Cur may be defined as next blocks (candidate blocks) that can be decoded after the current decoded block Cur.

As shown in FIG. 13(d), the left block, the right block, the top block, the bottom block, a top-left block, a top-right block, a bottom-left block and the bottom-right block which neighbor the current decoded block Cur in eight directions of the current block Cur may be defined as next blocks (candidate blocks) that can be decoded after the current decoded block Cur.

FIGS. 13(a) to 13(d) merely illustrate forms of blocks that can be decoded after the current block, and the present invention is not limited thereto and a group of one or more neighboring blocks of the current block, which are different from the aforementioned blocks, may be defined as a block that can be decoded after the current block.

A form (or group) of blocks that can be decoded after the current block may be defined and used in an encoding stage (i.e., encoder) and a decoding stage (i.e., decoder). Further, information about the form (or group) of blocks that can be decoded after the current block may be transmitted in a slice header, a picture parameter set (PSS), a sequence parameter set (SPS), a video parameter set (VPS) or the like.

The slice header refers to a slice header segment of an independent slice segment. Here, the independent slice segment refers to a current slice segment or a most recent independent slice segment prior to a current dependent slice segment according to decoding order.

The PPS refers to a syntax structure including a syntax element applied to zero or more coded pictures determined by a syntax element acquired in each slice segment header.

The SPS refers to a syntax structure including a syntax element applied to zero or more coded video sequences (CVSs) determined by content of a syntax element acquired in a PPS referred to by a syntax element acquired in each slice segment header.

The VPS refers to a syntax structure including a syntax element applied to zero or more CVSs determined by content of a syntax element acquired in an SPS referred to by a syntax element acquired in a PPS referred to by a syntax element acquired in each slice segment header.

In addition, the encoder may signal, to the decoder, information for indicating the position of a block to be decoded after the current block, among blocks that can be decoded after the current block, for each block.

Here, when there are two blocks that can be decoded after the current decoded block (e.g., in the case of FIG. 13(a)), a flag indicating the position of a block to be decoded after the current block may be transmitted to the decoder.

When there are three blocks that can be decoded after the current decoded block (e.g., in the cases of FIGS. 13(b), 13(c) and 13(d)), the position of a block to be decoded after the current block may be indicated using an index instead of the flag.

In addition, when there is only one block that can be decoded after the current decoded block, additional information for indicating the position of a block to be decoded after the current block may not be transmitted to the decoder.

According to an embodiment of the present invention, a block decoding order in units of a largest block may be designated instead of a sequential scanning order.

In this disclosure, "largest block unit" refers to a largest unit (e.g., CTU) when a picture is partitioned into block units and refers to a block (i.e., root node) partitioned into a smaller unit (e.g., CU, PU, TU or the like) according to recursive binary-tree or quad-tree partitioning.

In addition, when a picture is partitioned into blocks having the same size and encoded/decoded, "largest block unit" may refer to a block unit having the same size.

Figure 14:
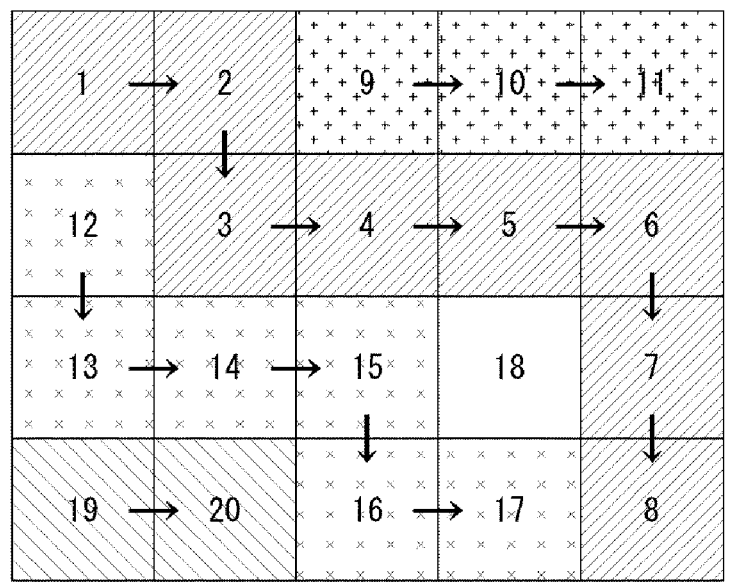
FIG. 14 is a diagram illustrating an arbitrary decoding order in units of a largest block according to an embodiment of the present invention.

FIG. 14 is a diagram illustrating an arbitrary decoding order in units of a largest block according to an embodiment of the present invention.

Although a case in which there are two blocks that can be decoded after the current block, as shown in FIG. 13(a), is assumed in FIG. 14 for convenience of description, the present invention is not limited thereto.

Referring to FIG. 14, it is possible to decode blocks in an arbitrary direction in such a manner that a right or bottom neighboring block is decoded after the current block, instead of decoding blocks in a fixed sequential decoding order as in the conventional method. In FIG. 14, numerals indicated in blocks represent a block decoding order of the blocks according to an arbitrary decoding order.

A flag indicating an arbitrary direction (i.e., information indicating the position of a next block to be decoded) may be transmitted or derived by the decoder per block.

Here, when there is only one candidate block that can be decoded after the current block (e.g., in the case of a block which has no right neighboring block and has only a bottom neighboring block, such as block #6 or #7, or a block which has no bottom neighboring block and has only a right neighboring block, such as block #16 or #19), an additional flag with respect to the corresponding block is not transmitted (if the flag is used) and the decoder may derive and use a next candidate block to be decoded (e.g., the bottom block in the case of block #6 or #7 and the right block in the case of block #16 or #19).

Alternatively, when there is only one candidate block that can be decoded after the current block, further decoding is not performed and decoding may be started again from the first block that has not been decoded yet in the sequential scanning order. That is, it is possible to decode blocks starting from block #9 which is the first block that has not been decoded yet in the sequential scanning order instead of decoding blocks #7 and #8 after decoding block #6 in the example of FIG. 14. In this case, an additional flag may not be transmitted with respect to the corresponding block (if the flag is used).

When there is no candidate block that can be decoded after the current block (e.g., in the case of a block which does not have a right neighboring block and a bottom neighboring block, such as block #8), the decoder may start decoding from the first block (i.e., block #9) that has not been decoded yet in the sequential scanning order. In this case, an additional flag may not be transmitted with respect to the corresponding block (if the flag is used).

Blocks that have not been decoded yet are decoded through the above-described method.

Tables 2 and 3 show syntaxes for an arbitrary decoding order in units of a largest block according to an embodiment of the present invention. It is assumed that the largest block unit is CTU in Table 2 and 3.

TABLE 2

| coding_tree_unit( ) { | Descriptor |
|---|---|
| if(ctu_order_flag) {  xCtb = ... // x-pos with raster scan order  yCtb = ... // y-pos with raster scand order }  else {  xCtb = ... // x-pos with down scan order  yCtb = ... // y-pos with down scan order }  if( slice_sao_luma_flag  \|\|  slice_sao_chroma_flag )  sao( xCtb >> CtbLog2SizeY, yCtb >> CtbLog2SizeY )  coding_quadtree( xCtb, yCtb, CtbLog2SizeY, 0 )  ctu_order_flag } | |

TABLE 3

| coding_tree_unit( ) { | Descriptor |
|---|---|
| ctu_order_flag  if(ctu_order_flag) {  xCtb = ... // x-pos with raster scan order  yCtb = ... // y-pos with raster scand order } | |

TABLE 3-continued

| coding_tree_unit( ) { | Descriptor |
|---|---|
|   else {<br>    xCtb = ... // x-pos with down scan order<br>    yCtb = ... // y-pos with down scan order<br>  }<br>  if( slice_sao_luma_flag  \|\|  slice_sao_chroma_flag )<br>    sao( xCtb >> CtbLog2SizeY, yCtb >> CtbLog2SizeY )<br>  coding_quadtree( xCtb, yCtb, CtbLog2SizeY, 0 )<br>} | |

Referring to Tables 2 and 3, only positions at which 'ctu_order_flag' is called are different. That is, Table 2 shows a case in which a 'ctu_order_flag' value called in an immediately previously decoded CTU is used to specify the position of the current CTU, and Table 3 shows a case in which a 'ctu_order_flag' value with respect to the current CTU is used to specify the position of the current CTU.

'ctu_order_flag' is a flag indicating a relative position with respect to the position of the current block and the position of a next block to be decoded. 'ctu_order_flag' indicates that the next block to be decoded is a block decoded in a sequential scanning order on the basis of the current decoded block when set to '1' and indicates that the next block to be decoded is a block decoded in an arbitrary scanning order indicated in else{ } on the basis of the current decoded block when set to '0'. Here, the position of the current CTU may be specified using the horizontal and vertical coordinates (xCtb, yCtb) of a top-left sample of the CTU as shown in Tables 2 and 3, and (xCtb, yCtb) may be specified as a relative position with respect to the top-left sample of the current picture.

When 'ctu_order_flag' is not transmitted, it can be regarded as '1'. As described above, 'ctu_order_flag' is not transmitted for all blocks and can be transmitted only when the number of blocks that can be decoded after decoding of the current block is two or more.

Here, a decoded map indicating whether decoding is performed in units of a largest block (e.g., CTU) may be used in order to check neighboring blocks which can be decoded and/or to detect the first block that has not been decoded yet in a sequential scanning order for decoding when there is no neighboring block that can be decoded. For example, the decoded map may be configured per picture or slice and may indicate whether decoding is performed in units of a largest block (e.g., CTU). Here, the position of each largest block unit may be specified in the sequential block scanning order in the decoded map, and 1 bit may be allocated per largest block unit. The value '1' may indicate that decoding is completed and the value '0' may indicate that decoding has not been performed yet. Upon completion of decoding of one largest block unit, information of a decoded map with respect to the corresponding block may be updated.

'coding_quadtree(xCtb, yCtb, CtbLog2SizeY, 0)' is a syntax element for specifying a CTU to be currently decoded. Here, (xCtb, yCtb) indicates horizontal and vertical coordinates of the top-left sample of the current CTU and CtbLog2SizeY indicates the size of the current CTU.

'slice_sao_luma_flag' indicates whether a sample adaptive offset (SAO) filter is used. 'slice_sao_luma_flag' indicates that SAO is enabled for a luma component in the current slice when set to '1' and indicates that SAO is disabled for the luma component in the current slice when set to '0'. If the value of 'slice_sao_luma_flag' is not present, the value can be regarded as '0'.

'slice_sao_chroma_flag' indicates whether the SAO filter is used. 'slice_sao_chroma_flag' indicates that SAO is enabled for a chroma component in the current slice when set to '1' and indicates that SAO is disabled for the chroma component in the current slice when set to '0'. If the value of 'slice_sao_luma_flag' is not present, the value can be regarded as '0'.

Accordingly, when 'slice_sao_luma_flag' or 'slice_sao_chroma_flag' is 1 (if (slice_sao_luma_flagvslice_sao_chroma_flag) is 'true'), a syntax for the SAO filter can be called for the current CTU (sao(xCtb>>CtbLog2SizeY, yCtb>>CtbLog2SizeY)).

According to another embodiment of the present invention, a block decoding order in units of a sub-block may be designated instead of a sequential scanning order.

Here, a sub-block may refer to a block partitioned from a predetermined block. The aforementioned largest block unit may be an example of a predetermined block, and an object region present in a picture may correspond to the predetermined block.

If an arbitrary decoding order in units of a sub-block partitioned from all largest block units is applied to the aforementioned largest block unit, additional signaling may not be needed to specify blocks including sub-blocks to which the arbitrary decoding order is applied.

On the other hand, when the arbitrary decoding order is applied to only sub-blocks belonging to a specific object region present in a picture (or sub-blocks partitioned from largest block units belonging to the specific object region), additional signaling for specifying the range of the specific object region (or largest block units belonging to the specific object region) may be transmitted to the decoder.

When decoding is performed in units of a sub-block as described above, consecutive blocks may have different sizes, distinguished from a case in which decoding is performed in units of a largest block in an arbitrary decoding order. Accordingly, definition of a next block that can be decoded on the basis of the current block, illustrated in FIG. 13, may be modified. This will be described below with reference to the drawing.

Figure 15:
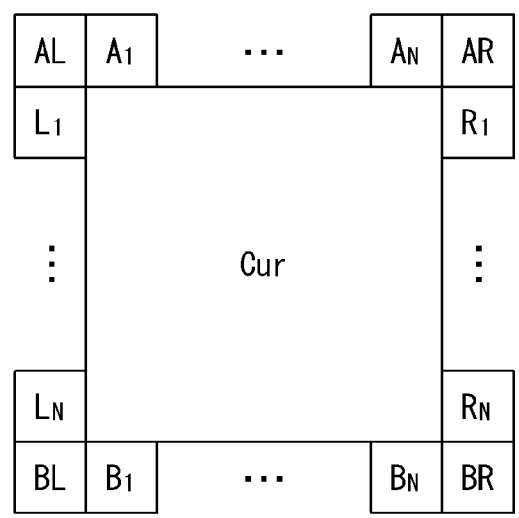
FIG. 15 is a diagram illustrating forms of neighboring blocks on the basis of a current block when an arbitrary decoding order according to an embodiment of the present invention is used.

FIG. 15 is a diagram illustrating a form of neighboring blocks on the basis of a current block when an arbitrary decoding order according to an embodiment of the present invention is used.

As shown in FIG. 15, a next block that can be decoded may be defined on the basis of a current decoded block Cur.

Left blocks, right blocks, top blocks and bottom blocks which neighbor the current block Cur in four directions may be divided into N blocks. That is, the left blocks may be divided into N blocks $L_1$ to $L_N$, the right blocks may be divided into N blocks $R_1$ to $R_N$, the top blocks may be divided into N blocks $A_1$ to $A_N$, and the bottom blocks may be divided into N blocks $B_1$ to $B_N$. In addition, a top-left block, a top-right block, a bottom-left block and a bottom-right block which neighbor the current block Cur may be defined along with the 4N neighboring blocks in the four directions as next blocks that can be decoded after the current block Cur.

As described above, a form (or group) of blocks that can be decoded after the current block may be predefined and used in the encoding stage (i.e., encoder) and the decoding stage (i.e., decoder). In addition, information on the form (or group) of blocks that can be decoded after the current block may be transmitted in a slice header, a picture parameter set (PPS), a sequence parameter set (SPS), a video parameter set (VPS) or the like.

Then, the encoder may signal, to the decoder, information for indicating the position of a next block to be decoded after the current block among blocks that can be decoded after the current block for each block.

Figure 16:
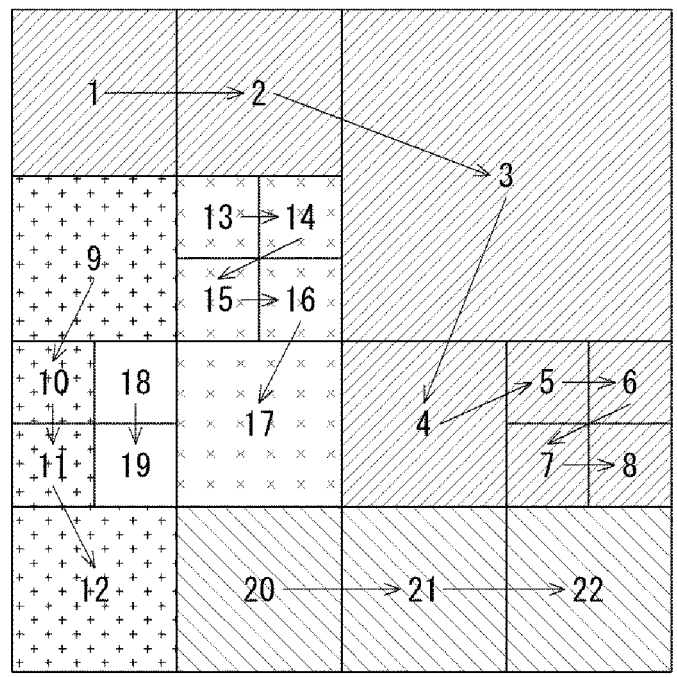
FIG. 16 is a diagram illustrating an arbitrary decoding order in units of a sub-block according to an embodiment of the present invention.

FIG. 16 is a diagram illustrating an arbitrary decoding order in units of a sub-block according to an embodiment of the present invention.

FIG. 16 illustrates a case in which a right block, a bottom block and a bottom-left block are defined as next blocks that can be decoded on the basis of a current decoded block.

An arbitrary decoding order in units of a sub-block may set a decoding order irrespective of block sizes (i.e., regardless of a size difference between the current block and a next block to be decoded). That is, which one of the right block, the bottom-block and the bottom-left block will be decoded after the current block may be indicated irrespective of block sizes. For example, block #3 is larger than block #2 but block #3 may be decoded after block #2. On the contrary, block #4 is smaller than block #3 but block #4 may be decoded after block #3.

If the next block is larger than the current block, a plurality of blocks may be indicated when only a direction of the next block, such as a right block, a bottom block or a bottom-left block, is indicated as described above. For example, when a block to be decoded after block #3 is a bottom block, blocks #4, #5 and #6 can correspond to bottom blocks to be decoded after block #3. Accordingly, a block to be decoded first in a sequential scanning order among the plurality of blocks in the corresponding direction may be determined as the next block to be decoded in this case. That is, even if bottom blocks are indicated as a block to be decoded after block #3, the decoder can determine block #4 to be the next block to be decoded.

Since the number of neighboring blocks that can be decoded is 3 in the embodiment of FIG. 16, the next block to be decoded may be indicated using an index (i.e., 2 bits) instead of a flag. If the number of neighboring blocks that can be decoded is 2, the next block to be decoded may be indicated using a flag (i.e., 1 bit). That is, a decoding order may be adaptively determined depending on the number of neighboring blocks that can be decoded.

In the example of FIG. 15, which one of the right blocks $R_1$ to $R_N$ is a next block to be decoded and which one of the bottom blocks $B_1$ to $B_N$ is a next block to be decoded may be signaled to the decoder.

If only one block is present as a next block to be decoded, decoding may be performed from a block that has not been decoded in the sequential scanning order. For example, only bottom blocks can be decoded after decoding of block #8 is completed, and thus decoding may be started from block #9 in the sequential scanning order. In the case of block #12 or #17, only one block is present as a next neighboring block that can be decoded, and thus decoding may be started from block #13 or #18 in the sequential scanning order.

To check neighboring blocks that can be decoded and/or to detect a first block that has not been decoded in the sequential scanning order when there is no neighboring block that can be decoded, a decoded map indicating whether decoding is performed in units of a smallest sub-block for one block (i.e., a block partitioned into sub-blocks, for example, CTU) may be used. For example, the decoded map may be configured in units of a block from which sub-blocks are partitioned and may indicate whether decoding is performed per sub-block. Here, positions of sub-blocks may be specified in a sequential block scanning order in the decoded map, and 1 bit is allocated to each sub-block. A value '1' may indicate that decoding is completed and a value '0' may indicate that decoding is not performed yet. When decoding of one sub-block is completed, information of a decoded map with respect to the corresponding block may be updated.

Differently from the arbitrary decoding method in units of a largest block, the decoder needs to know the size of a next block to be decoded when a decoding method in an arbitrary decoding order in units of a sub-block is used. Accordingly, the decoder needs to know partitioning information about all blocks. For example, the decoder can parse all 'split_cu_flag' syntaxes when CTU decoding is started to simultaneously decode partitioning information of the corresponding CTU in a quad-tree structure, to thereby calculate the partitioning information about the corresponding CTU block in advance. In this manner, decoding in an arbitrary decoding order can be performed using the proposed flag or index indicating the direction of a next block to be decoded in a situation in which partitioning information of blocks are known in advance.

According to another embodiment of the present invention, a block decoding order may be designated in units of an arbitrary block instead of a sequential scanning order.

That is, a picture is partitioned into blocks having a specific size and decoding is performed in an arbitrary decoding order in units of a sub-block partitioned from a block having the specific size in the above-described sub-block based decoding method, whereas decoding may be performed for an entire picture in an arbitrary decoding order in units of an arbitrary block irrespective of sizes of blocks partitioned from the picture according to the present embodiment.

Figure 17:
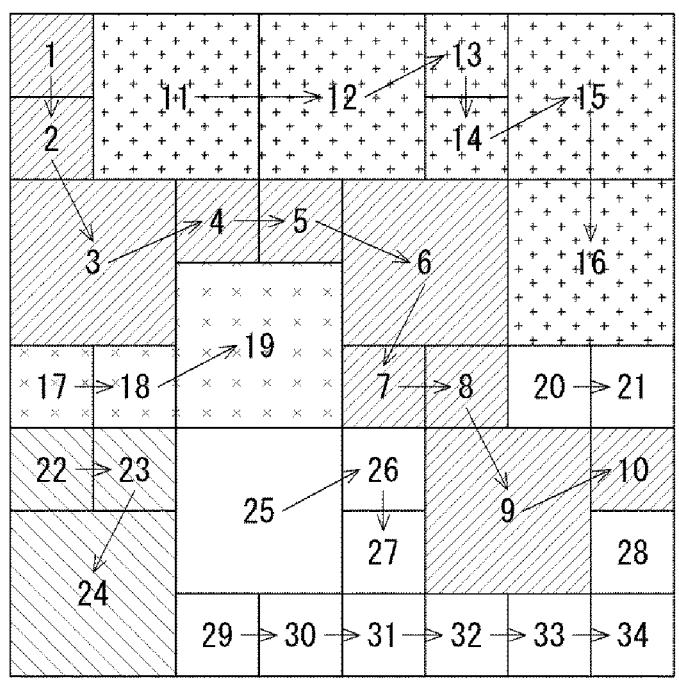
FIG. 17 is a diagram illustrating an arbitrary decoding order in units of an arbitrary block according to an embodiment of the present invention.

FIG. 17 is a diagram illustrating an arbitrary decoding order in units of an arbitrary block according to an embodiment of the present invention.

FIG. 17 illustrates a case in which a right block and a bottom block are defined as next blocks that can be decoded on the basis of a current decoded block.

The arbitrary decoding order in units of an arbitrary block may designate a decoding order irrespective of block sizes (that is, regardless of a size difference between the current block and a next block to be decoded). That is, which one of a right block and a bottom block will be decoded after the current block may be indicated irrespective of block sizes. For example, block #3 is larger than block #2 but block #3 may be decoded after block #2. Block #4 is smaller than block #3 but block #4 may be decoded after block #3.

If the next block is larger than the current block, a plurality of blocks may be indicated when only a direction of the next block, such as a right block or a bottom block, is indicated as described above. For example, when a block to be decoded after block #12 is a right block, blocks #13 and #14 can correspond to blocks to be decoded after block #12. Accordingly, a block to be decoded first in the sequential scanning order among the plurality of blocks in the corresponding direction may be determined as the next block to be decoded in this case. That is, even if right blocks are indicated as a block to be decoded after block #12, the decoder can determine block #13 to be the next block to be decoded.

In the example of FIG. 15, which one of the right blocks $R_1$ to $R_N$ is a next block to be decoded and which one of the bottom blocks $B_1$ to $B_N$ is a next block to be decoded may be signaled to the decoder.

If only one block is present as a next block to be decoded, decoding may be performed from a block that has not been decoded in the sequential scanning order. For example, only bottom blocks can be decoded after decoding of block #10 is completed, and thus decoding may be started from block #11 in the sequential scanning order.

To check neighboring blocks that can be decoded and/or to detect a first block that has not been decoded in the sequential scanning order when there is no neighboring block that can be decoded, a decoded map indicating whether decoding is performed in units of a smallest block for one picture may be used. For example, the decoded map may be configured in units of a block partitioned from the picture and may indicate whether decoding is performed per block. Here, positions of blocks may be specified in a sequential block scanning order in the decoded map, and 1 bit is allocated to each block. A value '1' may indicate that decoding is completed and a value '0' may indicate that decoding is not performed yet. When decoding of one block is completed, information of a decoded map with respect to the corresponding block may be updated.

An arbitrary decoding method performed in units of an arbitrary block needs to know the size of a next block to be decoded. Since the conventional video compression method partitions an image on the basis of a predetermined CTU block and further partitions blocks into small blocks in a quad-tree form within CTU, block partitioning information can be obtained using 'split_cu_flag' syntax. However, in the case of video compression based on an arbitrary block size, a reference block (e.g., CTU) is not present and thus block partitioning information cannot be obtained using only 'split_cu_flag' syntax. Accordingly, it is necessary to transmit information on the size of a next block to be decoded after the current block along with information on the position of the next block in the method proposed by the present invention.

The size of the next block to be decoded may be indicated by transmitting an index that defines a predetermined block size. Alternatively, the size of the next block to be decoded may be indicated by a difference value using a difference between the size of the current block and the size of a previous block.

Table 4 shows a syntax for an arbitrary decoding order in units of an arbitrary block according to an embodiment of the present invention.

TABLE 4

| coding_tree_unit( ) { | Descriptor |
|---|---|
| cu_width_delta | |
| x0 = ... // x-pos with raster scan order | |
| y0 = ... // y-pos with raster scand order | |
| } | |
| else { | |
| x0 = ... // x-pos with down scan order | |
| y0 = ... // y-pos with down scan order | |
| } | |
| coding_unit(x0, y0, log2CbSize ) | |
| ctu_order_flag | |
| } | |

Referring to Table 4, 'cu_width_delta' syntax indicates a difference between the sizes of consecutive blocks in an arbitrary decoding order. For example, it can indicate a difference between the sizes of the current block and a next block to be decoded in the arbitrary decoding order. Alternatively, it may indicate a difference between the sizes of a previous block and the current block in the arbitrary decoding order.

An initial block size (width or height) for the first block in a picture or a slice may be transmitted in a VPS, an SPS, a PPS or a slice header. To reduce transmission overhead with respect to 'cu_width_delta' syntax, sizes of consecutive blocks which can be changed at a time in an arbitrary decoding order may be limited.

When the decoding method performed in an arbitrary decoding order according to the present invention is used, positions or states of neighboring blocks that can be used for reference may change. This will be described below with reference to the drawings.

Figure 18:
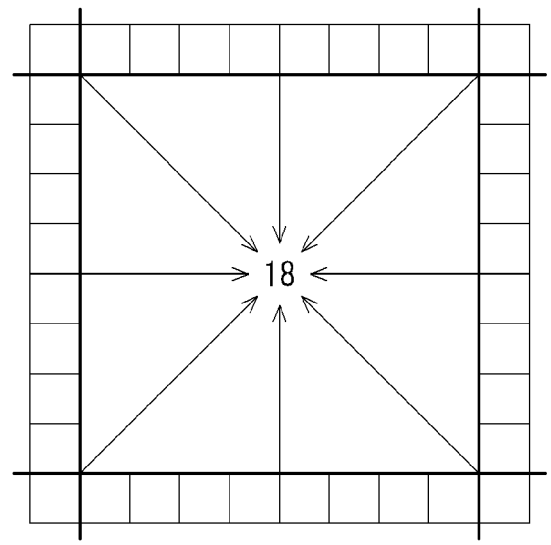
FIG. 18 is a diagram illustrating intra-prediction and inter-prediction methods when a decoding method performed in an arbitrary decoding order according to an embodiment of the present invention is used.
Figure 18:
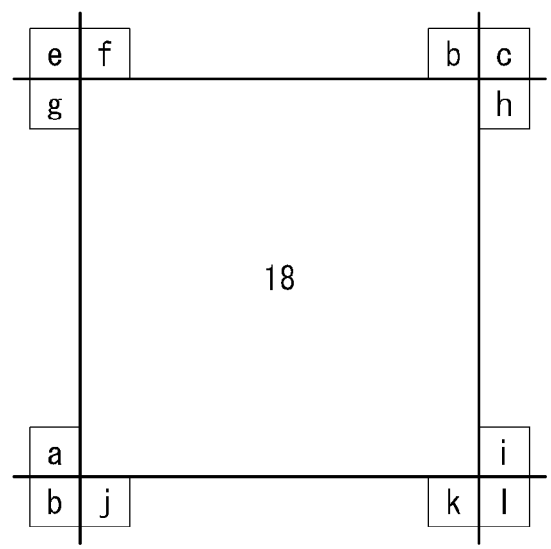

FIG. 18 is a diagram illustrating intra-prediction and inter-prediction methods when the decoding method performed in an arbitrary decoding order according to an embodiment of the present invention is used.

FIG. 18 illustrates block #18 in FIG. 16. In the case of block #18 in FIG. 16, all neighboring blocks of block #18 have been decoded before decoding of block #18. Accordingly, information from neighboring blocks in all directions can be used when information of neighboring blocks is referred to in intra-prediction and inter-prediction.

FIG. 18(a) illustrates an intra-prediction method. In the case of intra-prediction, only left blocks or top blocks may be used as available neighboring blocks when decoding is performed in the conventional sequential scanning order. On the other hand, an intra-prediction method performed in an arbitrary decoding order according to the present invention can perform prediction using right blocks and bottom blocks as well as left blocks and top blocks, as shown in FIG. 18(a).

In intra-prediction, a prediction direction of conventional intra-prediction may be used as a prediction direction or a new prediction direction may be defined and used for additionally available directions. When the prediction direction of conventional intra-prediction is used, prediction may be performed in the form of bidirectional linear interpolation. That is, when blocks neighboring the current block in all directions can be referred to as shown in FIG. 18(a), two reference samples (here, each reference sample may correspond to an interpolated value between consecutive neighboring samples) may be used in an intra-prediction mode direction of the current block (i.e., block #18). Accordingly, a value obtained by linearly interpolating the two reference samples can be derived as a final intra-predicted sample value.

Although FIG. 18(a) shows a case in which all neighboring blocks can be used, some neighboring blocks may not be present according to decoding order. In this case, an intra-prediction direction may be defined only for directions that can be used. The aforementioned bidirectional linear interpolation can be used only when all bidirectional blocks for the corresponding intra-prediction direction are present.

FIG. 18(b) illustrates an inter-prediction method. An inter-prediction method performed in an arbitrary decoding order according to the present invention may perform prediction using right blocks and bottom blocks as well as left blocks and top blocks, as shown in FIG. 18(b). That is, the decoder may derive a candidate block list (e.g., a merge candidate list and a motion vector predictor candidate list) for deriving motion information of the current block from a next candidate block that can be decoded after the current block.

In conventional inter-prediction, motion vectors of neighboring blocks that have already been decoded may be reused or used to predict the motion vector of the current block. For example, some of blocks a, b, c, d, e, f and g may be used for motion vector reuse and prediction.

On the other hand, inter-prediction according to arbitrary decoding of the present invention may also use left blocks and top blocks, and thus blocks h, i, j, k and l can be additionally used. That is, motion vectors of the blocks h, i, j, k and l may be reused and used for prediction.

Although FIG. 18 shows a case in which all neighboring blocks can be used, some neighboring blocks may not be present according to decoding order. Accordingly, candidate blocks may be derived only from neighboring blocks that can be used when motion vectors are reused and used for prediction.

Figure 19:
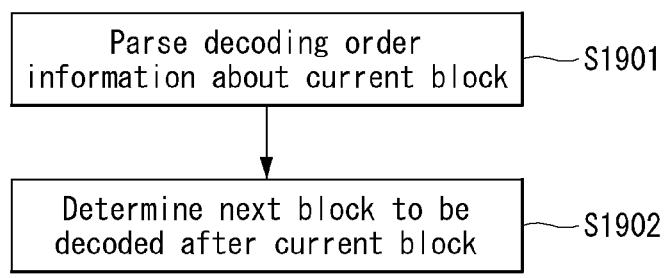
FIG. 19 is a diagram illustrating an image decoding method according to an embodiment of the present invention.

FIG. 19 is a diagram illustrating an image decoding method according to an embodiment of the present invention.

Referring to FIG. 19, a decoder parses decoding order information about a current block (S1901).

Here, the decoding order information refers to information for indicating the position of a next block to be decoded after the current block. The decoding order information may indicate a relative position of the next block with respect to the current block. For example, the decoding order information may be transmitted from an encoder in the form of a flag or an index.

Here, an image (picture) may be partitioned into first block units (e.g., 'largest block units') having the same size and the current block may correspond to a first block.

In addition, the first block units may be partitioned into sub-blocks having arbitrary sizes and the current block may correspond to a sub-block.

An image (picture) may be partitioned into second block units having arbitrary sizes and the current block may correspond to a second block. In this case, the decoding order information may further include information indicating the size of the next block that will be decoded after the current block.

The decoder determines a next block to be decoded after the current block on the basis of the decoding order information (S1902).

Here, one of predefined candidate blocks that can be decoded after the current block may be selected as the next block. For example, candidate blocks can be determined as in the example of FIG. 13 or the example of FIG. 15.

If the decoding order information about the current block is not present, only one block is counted as a candidate block for the current block and the candidate block may be determined as the next block of the current block. In other words, when there is only one candidate block for the current block, the decoding order information may not be transmitted from the encoder.

In addition, when the decoding order information about the current block is not present, the first block that has not been decoded yet in the raster scan order in the image may be determined as the next block.

When the next block to be decoded after the current block is determined as described above, a decoding process (e.g., one or more of inverse quantization, inverse transform, intra/inter-prediction and filtering) is performed on the current block, and then a decoding process (e.g., one or more of inverse quantization, inverse transform, intra/inter-prediction and filtering) is performed on the next block. For example, when intra-prediction in the intra angular mode is applied to the current block when intra-prediction is performed as shown in FIG. 18, a predicted sample of a current sample may be derived by linearly interpolating bidirectional reference samples in the intra-prediction mode on the basis of the current sample in the current block. As another example, when inter-prediction is applied to the current block, a candidate block list for driving motion information of the current block may be derived from candidate blocks that can be decoded after the current block.

The decoder decodes the image by repeating the aforementioned process for each block constituting the image.

Figure 20:
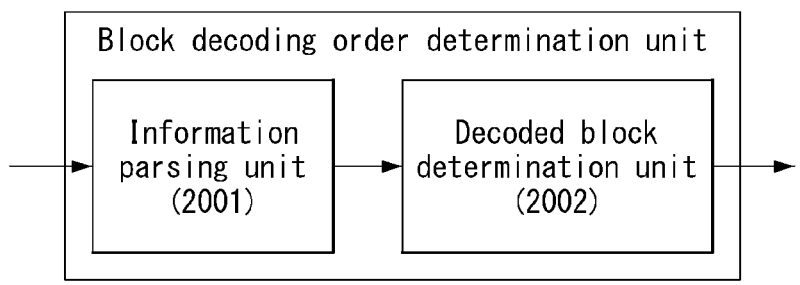
FIG. 20 is a diagram illustrating a block decoding order determination unit according to an embodiment of the present invention.

FIG. 20 is a diagram illustrating a block decoding order determination unit according to an embodiment of the present invention.

Referring to FIG. 20, the block decoding order determination unit implements the functions, processes and/or methods described with referent to FIGS. 13 to 19. In addition, the block decoding order determination unit may be realized as a decoder device by being combined with all or some of the components of the decoder illustrated in FIG. 2.

Specifically, the block decoding order determination unit may include an information parsing unit 2001 and a decoded block determination unit 2002.

The information parsing unit 2001 parses decoding order information about a current block.

As described above, the decoding order information refers to information for indicating the position of a next block to be decoded after the current block. The decoding order information may indicate a relative position of the next block with respect to the current block. For example, the decoding order information may be transmitted from an encoder in the form of a flag or an index.

Here, an image (picture) may be partitioned into first block units (e.g., 'largest block units') having the same size and the current block may correspond to a first block.

In addition, the first block units may be partitioned into sub-blocks having arbitrary sizes and the current block may correspond to a sub-block.

An image (picture) may be partitioned into second block units having arbitrary sizes and the current block may correspond to a second block. In this case, the decoding order information may further include information indicating the size of the next block that will be decoded after the current block.

The decoded block determination unit 2002 determines a next block to be decoded after the current block on the basis of the decoding order information.

Here, one of predefined candidate blocks that can be decoded after the current block may be selected as the next block. For example, candidate blocks can be determined as in the example of FIG. 13 or the example of FIG. 15.

If the decoding order information about the current block is not present, only one block is counted as a candidate block for the current block and the candidate block may be determined as the next block of the current block. In other words, when there is only one candidate block for the current block, the decoding order information may not be transmitted from the encoder.

In addition, when the decoding order information about the current block is not present, the first block that has not been decoded yet in the raster scan order in the image may be determined as the next block.

When the next block to be decoded after the current block is determined as described above, a decoding process (e.g., one or more of inverse quantization, inverse transform, intra/inter-prediction and filtering) is performed on the current block, and then a decoding process (e.g., one or more of inverse quantization, inverse transform, intra/inter-prediction and filtering) is performed on the next block. For example, when intra-prediction in the intra angular mode is applied to the current block when intra-prediction is performed as shown in FIG. 18, a predicted sample of a current sample may be derived by linearly interpolating bidirectional reference samples in the intra-prediction mode on the basis of the current sample in the current block. As another example, when inter-prediction is applied to the current block, a candidate block list for driving motion information of the current block may be derived from candidate blocks that can be decoded after the current block.

In the aforementioned embodiments, the elements and characteristics of the present invention have been combined in specific forms. Each of the elements or characteristics may be considered to be optional unless otherwise described explicitly. Each of the elements or characteristics may be implemented in such a way as to be not combined with other elements or characteristics. Furthermore, some of the elements and/or the characteristics may be combined to form an embodiment of the present invention. The order of the operations described in connection with the embodiments of the present invention may be changed. Some of the elements or characteristics of an embodiment may be included in another embodiment or may be replaced with corresponding elements or characteristics of another embodiment. It is evident that an embodiment may be configured by combining claims not having an explicit citation relation in the claims or may be included as a new claim by amendments after filing an application.

The embodiment of the present invention may be implemented by various means, for example, hardware, firmware, software or a combination of them. In the case of implementations by hardware, an embodiment of the present invention may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers and/or microprocessors.

In the case of an implementation by firmware or software, an embodiment of the present invention may be implemented in the form of a module, procedure, or function for performing the aforementioned functions or operations. Software code may be stored in memory and driven by a processor. The memory may be located inside or outside the processor, and may exchange data with the processor through a variety of known means.

It is evident to those skilled in the art that the present invention may be materialized in other specific forms without departing from the essential characteristics of the present invention. Accordingly, the detailed description should not be construed as being limitative from all aspects, but should be construed as being illustrative. The scope of the present invention should be determined by reasonable analysis of the attached claims, and all changes within the equivalent range of the present invention are included in the scope of the present invention.

INDUSTRIAL APPLICABILITY

The aforementioned preferred embodiments of the present invention have been disclosed for illustrative purposes, and those skilled in the art may improve, change, substitute, or add various other embodiments without departing from the technological spirit and scope of the present invention disclosed in the attached claims.

The invention claimed is:

1. A method for decoding an image by a decoding device, the method comprising:
    parsing decoding order information for indicating a position of a next block to be decoded after a current block; and
    determining the next block to be decoded after the current block, on the basis of the decoding order information,
    wherein the decoding order information indicates a relative position of the next block on the basis of the current block, and the next block is selected as a block among predefined candidate blocks decodable after the current block,
    wherein when the decoding order information about the current block is not present, it is assumed that there is only one candidate block for the current block and the next block of the current block is determined as the one candidate block,
    wherein when there is no candidate block, a first block that has not been decoded yet in a raster scan order is determined as the next block,
    wherein the candidate blocks include a right block neighboring to a right side of the current block and a bottom block neighboring to a bottom side of the current block.

2. The method according to claim 1, wherein the candidate blocks further include a bottom-right block neighboring to a bottom-right side of the current block.

3. The method according to claim 1, wherein the candidate blocks further include a top block neighboring to a top side of the current block and a left block neighboring to a left side of the current block.

4. The method according to claim 3, wherein the candidate blocks further include a top-left block neighboring to a top-left side of the current block, a top-right block neighboring to a top-right side of the current block, a bottom-left block neighboring to a bottom-left side of the current block and a bottom-right block neighboring to a bottom-right side of the current block.

5. The method according to claim 1, wherein the image is partitioned into first block units having the same size, and the current block corresponds to a first block.

6. The method according to claim 5, wherein the first block is partitioned into sub-blocks having arbitrary sizes, and the current block corresponds to a sub-block.

7. The method according to claim 1, wherein the image is partitioned into second block units having arbitrary sizes, and the current block corresponds to a second block.

8. The method according to claim 7, wherein the decoding order information further includes size information of the next block.

9. The method according to claim 1, wherein, when intra-prediction in an intra angular mode is applied to the current block, a predicted sample of a current sample in the current block is derived by linearly interpolating bidirectional reference samples according to the intra-prediction mode on the basis of the current sample.

10. The method according to claim 1, wherein, when inter-prediction is applied to the current block, a candidate block list for deriving motion information of the current block is derived from candidate blocks decodable after the current block.

11. A decoding device for decoding an image, comprising:
    an information parsing unit for parsing decoding order information for indicating a position of a next block to be decoded after a current block; and
    a decoded block determination unit for determining the next block to be decoded after the current block, on the basis of the decoding order information,
    wherein the decoding order information indicates a relative position of the next block on the basis of the current block, and the next block is selected as a block among predefined candidate blocks decodable after the current block,
    wherein when the decoding order information about the current block is not present, it is assumed that there is only one candidate block for the current block and the next block of the current block is determined as the one candidate block, wherein when there is no candidate block, a first block that has not been decoded yet in a raster scan order is determined as the next block, wherein the candidate blocks include a right block neighboring to a right side of the current block and a bottom block neighboring to a bottom side of the current block.

* * * * *